(12) United States Patent
Werner et al.

(10) Patent No.: US 9,906,048 B2
(45) Date of Patent: Feb. 27, 2018

(54) NON-CONTACT POWER SUPPLY APPARATUS

(71) Applicant: Panasonic Intellectual Property Management Co., Ltd., Osaka (JP)

(72) Inventors: Steffen Werner, Osaka (JP); Hiroki Iwamiya, Kyoto (JP); Koji Higashiyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 329 days.

(21) Appl. No.: 14/654,550

(22) PCT Filed: Dec. 26, 2013

(86) PCT No.: PCT/JP2013/007617
§ 371 (c)(1),
(2) Date: Jun. 22, 2015

(87) PCT Pub. No.: WO2014/103316
PCT Pub. Date: Jul. 3, 2014

(65) Prior Publication Data
US 2015/0340874 A1    Nov. 26, 2015

(30) Foreign Application Priority Data

Dec. 28, 2012 (JP) .................... 2012-287099

(51) Int. Cl.
*H02J 5/00* (2016.01)
*H02J 17/00* (2006.01)
(Continued)

(52) U.S. Cl.
CPC .............. *H02J 5/005* (2013.01); *H01F 38/14* (2013.01); *H02J 7/025* (2013.01); *H02J 17/00* (2013.01); *H02J 50/10* (2016.02); *H02J 50/60* (2016.02)

(58) Field of Classification Search
CPC ............ H02J 3/005; H02J 17/00; H02J 7/025
(Continued)

(56) References Cited

U.S. PATENT DOCUMENTS 9,331,495 B2 * 5/2016 Soar .......................... F41G 1/34
9,490,665 B2 * 11/2016 Uchida .................... H02J 17/00
(Continued)

FOREIGN PATENT DOCUMENTS

DE    202009009693 U    11/2010
DE    102009033236    1/2011
(Continued)

OTHER PUBLICATIONS

The Extended European Search Report dated Jan. 4, 2016 for the related European Patent Application No. 13868943.5.
(Continued)

*Primary Examiner* — Dinh T Le
(74) *Attorney, Agent, or Firm* — McDermott Will & Emery LLP

(57) ABSTRACT

A non-contact power supply apparatus includes a first coil, a second coil opposed to the first coil, and a sensor. The sensor includes an insulator, transmitting main antenna parts, transmitting sub antenna parts, a transmitting circuit, receiving main antenna parts, receiving sub antenna parts, and a receiving circuit.

28 Claims, 20 Drawing Sheets

(51) Int. Cl.
*H01F 38/14* (2006.01)
*H02J 7/02* (2016.01)
*H02J 50/10* (2016.01)
*H02J 50/60* (2016.01)

(58) Field of Classification Search
USPC .......................................................... 307/104
See application file for complete search history.

(56) References Cited

U.S. PATENT DOCUMENTS

| | | | |
|---|---|---|---|
| 9,496,732 B2 * | 11/2016 | Partovi | ................. H02J 7/0042 |
| 2008/0200119 A1 | 8/2008 | Onishi et al. | |
| 2010/0271048 A1 | 10/2010 | Kouno | |
| 2012/0187757 A1 | 7/2012 | Wechlin et al. | |
| 2013/0099592 A1 | 4/2013 | Abe | |
| 2013/0169062 A1 | 7/2013 | Maikawa et al. | |

FOREIGN PATENT DOCUMENTS

| | | |
|---|---|---|
| EP | 2276109 | 1/2011 |
| JP | 2008-206231 | 9/2008 |
| JP | 2012-075200 | 4/2012 |
| JP | 2012-244778 | 12/2012 |
| WO | 2010/136927 | 12/2010 |
| WO | 2012/002063 | 1/2012 |
| WO | 2012/165244 | 12/2012 |
| WO | 2014/063159 | 4/2014 |

OTHER PUBLICATIONS

International Search Report of PCT application No. PCT/JP2013/007617 dated Mar. 11, 2014.

* cited by examiner

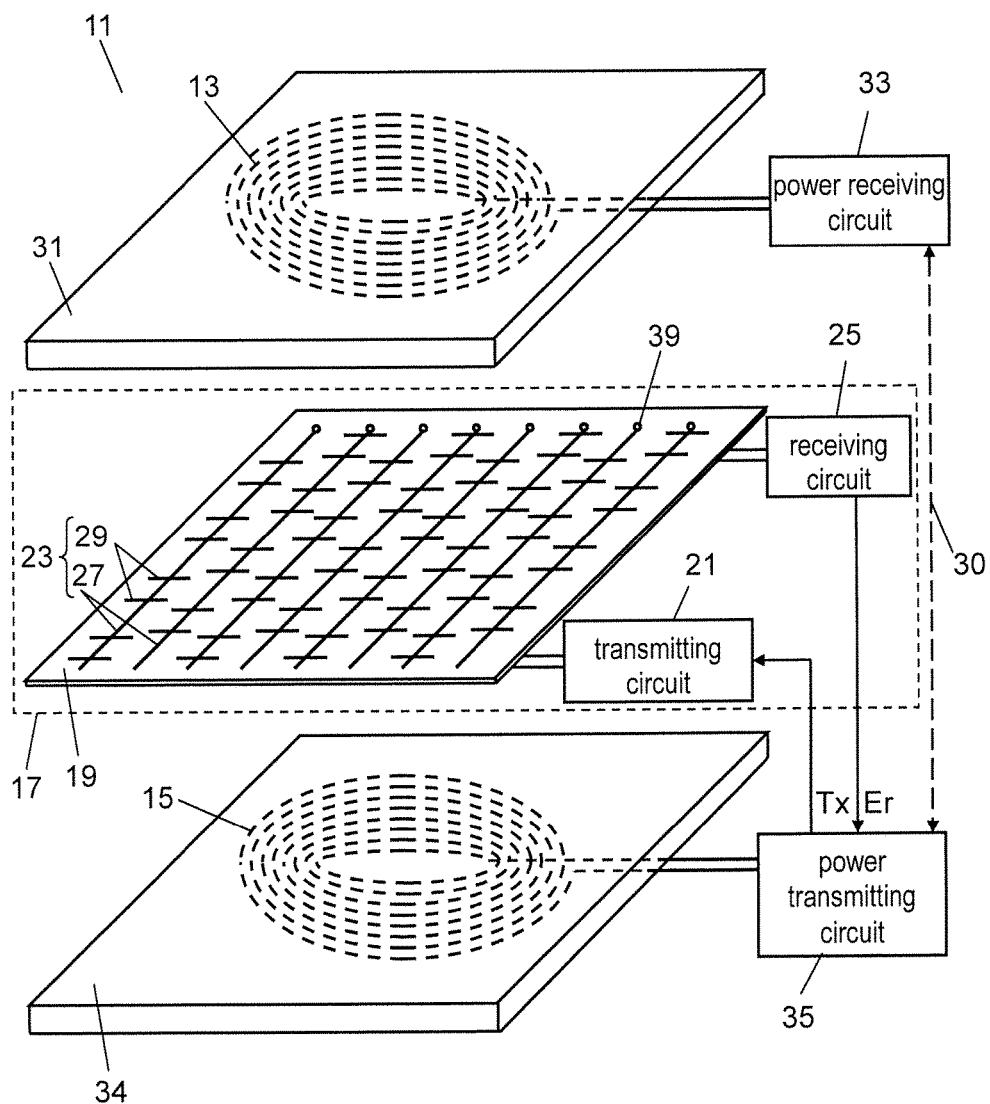

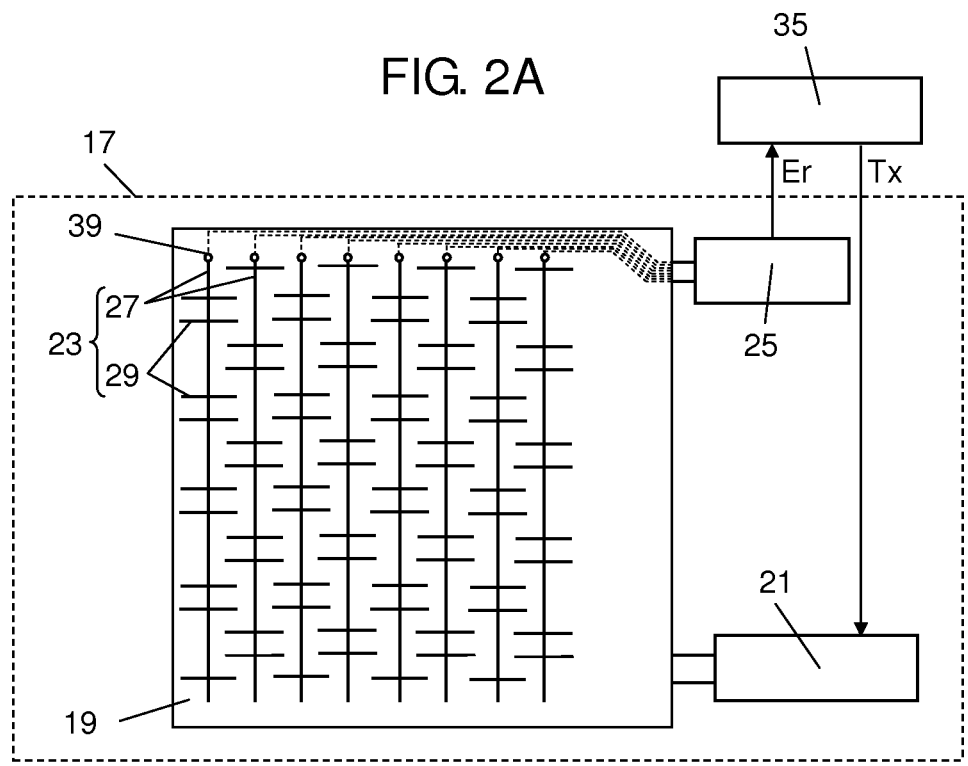
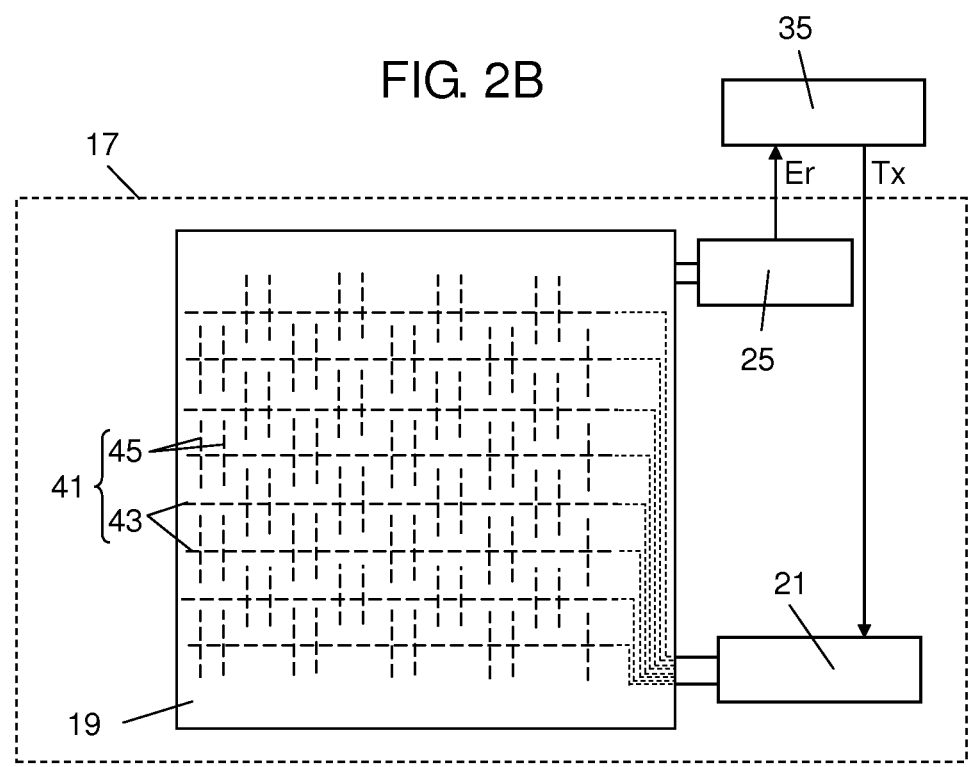

FIG. 2C
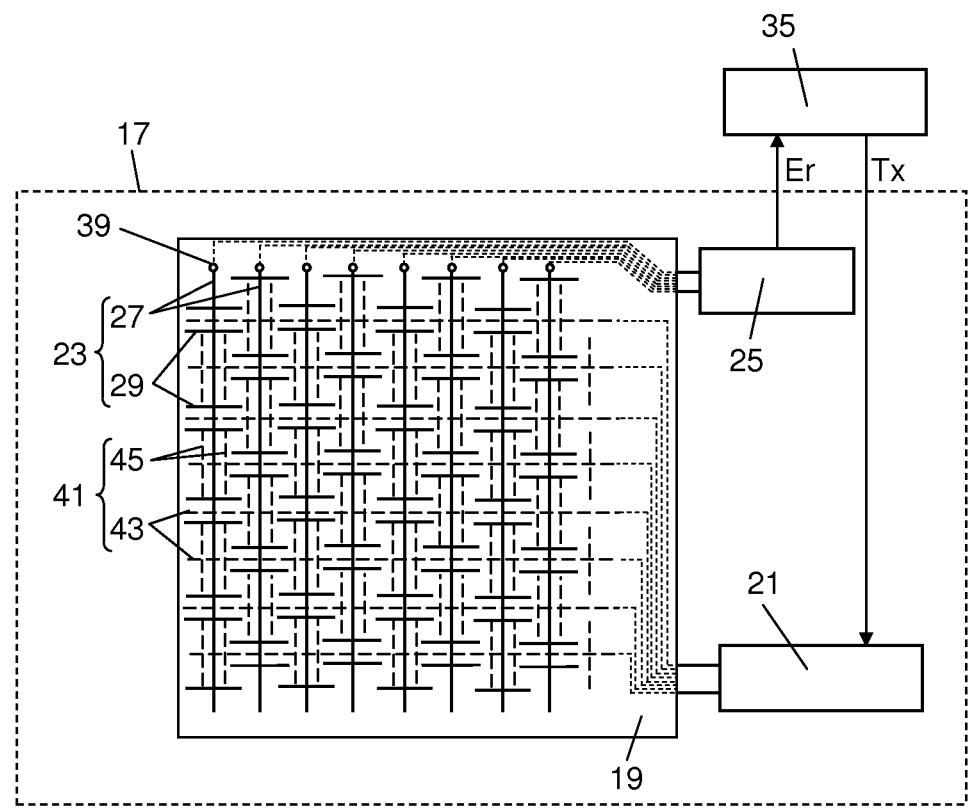
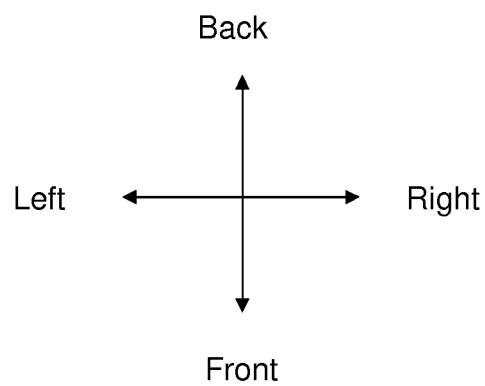

NON-CONTACT POWER SUPPLY APPARATUS

CROSS-REFERENCE TO RELATED APPLICATIONS

This application is a U.S. national stage application of the PCT International Application No. PCT/JP2013/007617 filed on Dec. 26, 2013, which claims the benefit of foreign priority of Japanese patent application 2012-287099 filed on Dec. 28, 2012, the contents all of which are incorporated herein by reference.

TECHNICAL FIELD

This technical field relates to a non-contact power supply apparatus for transmitting electric power in a non-contact manner.

BACKGROUND ART

Recently, a non-contact power supply apparatus (contactless power transmission system) for transmitting electric power in a non-contact (contactless) manner has been developed instead of direct electrical connection.

FIG. 19 is a circuit diagram of an essential part of conventional non-contact power supply apparatus 100. Non-contact power supply apparatus 100 includes power receiver 101, power transmission controller 119, and power transmitter 120.

When power transmission is continued in the state where metallic foreign object 129 is interposed between power transmitting coil 123 and power receiving coil 127 in non-contact power supply apparatus 100, eddy current flowing through metallic foreign object 129 generates heat. To address this problem, the following method is devised. Whether metallic foreign object 129 is present between power transmitting coil 123 and power receiving coil 127 is detected by signal processing. The method is detailed below.

Power receiver 101 includes the following elements: load modulation transistor 103; rectifying circuit 104; power supply control transistor 105; power receiver side control circuit 107; low drop-out (LDO) regulator 109; and power receiving coil 127. Load modulation transistor 103 performs load modulation. Power supply control transistor 105 controls power supply. Power receiver side control circuit 107 controls load modulation transistor 103 and power supply control transistor 105.

The voltages at the input end and the output end of low drop-out regulator 109 are input to power receiver side control circuit 107 through signal lines 111, 113, respectively. Power receiver side control circuit 107 detects the state of load 115 by measuring the voltage across low drop-out regulator 109. Load 115 is formed of battery 117 and charge controller 116.

Power transmitter 120 includes power transmitting coil 123 and power transmitting part 124. Power transmission controller 119 includes waveform detecting circuit 121, voltage detecting circuit 122, power transmitter side control circuit 125, and driver control circuit 126.

In power transmission controller 119, waveform detecting circuit 121 detects the peak value of the amplitude of the induced voltage of power transmitting coil 123. As a result, power transmitter side control circuit 125 detects fluctuations in the load of power receiver 101.

Power receiver 101 performs load modulation during normal power transmission, and transmits foreign object detection signal PT1 from power receiving coil 127 to power transmitter 120. In response to this signal, power transmitter side control circuit 125 measures a change in the load of power receiver 101. When foreign object detection signal PT1 cannot be received, power transmitter side control circuit 125 determines that metallic foreign object 129 is present and stops normal power transmission. With this configuration, metallic foreign object 129 between transmitting coil 123 and receiving coil 127 is detected.

As a prior art document related to the above technology, Patent Literature 1, for example, is known.

CITATION LIST

Patent Literature

PTL1: Japanese Patent Unexamined Publication No. 2008-206231

SUMMARY OF THE INVENTION

A non-contact power supply apparatus includes the following elements: a first coil; a second coil opposed to the first coil; and a sensor. The sensor includes the following elements: an insulator; transmitting main antenna parts; transmitting sub antenna parts; a transmitting circuit; receiving main antenna parts; receiving sub antenna parts; and a receiving circuit. The insulator is disposed between the first coil and the second coil. Each of the transmitting main antenna parts is formed, in a straight shape, on the first face of the insulator. Each of the transmitting sub antenna parts is formed on the first face of the insulator, intersects the corresponding one of the transmitting main antenna parts, and is electrically connected thereto. The transmitting circuit is electrically connected to the transmitting main antenna parts, and transmits a signal. Each of the receiving main antenna parts is formed, in a straight shape, on the second face, which is opposite the first face, of the insulator. Each of the receiving sub antenna parts is formed on the second face of the insulator, intersects the corresponding one of the receiving main antenna parts, and is electrically connected thereto. The receiving circuit is electrically connected to the receiving main antenna parts. The receiving circuit receives the signal through the receiving main antenna parts and the receiving sub antenna parts, and senses an object except the insulator between the first coil and the second coil, based on a change in the characteristic of the signal received.

BRIEF DESCRIPTION OF DRAWINGS

FIG. 1 is an exploded perspective view of a non-contact power supply apparatus in accordance with a first exemplary embodiment.

FIG. 2A is an explanatory view of receiving antennas of the non-contact power supply apparatus in accordance with the first exemplary embodiment.

FIG. 2B is an explanatory view of transmitting antennas of the non-contact power supply apparatus in accordance with the first exemplary embodiment.

FIG. 2C is a top view of a sensor of the non-contact power supply apparatus in accordance with the first exemplary embodiment.

DESCRIPTION OF EMBODIMENTS

Figure 3:
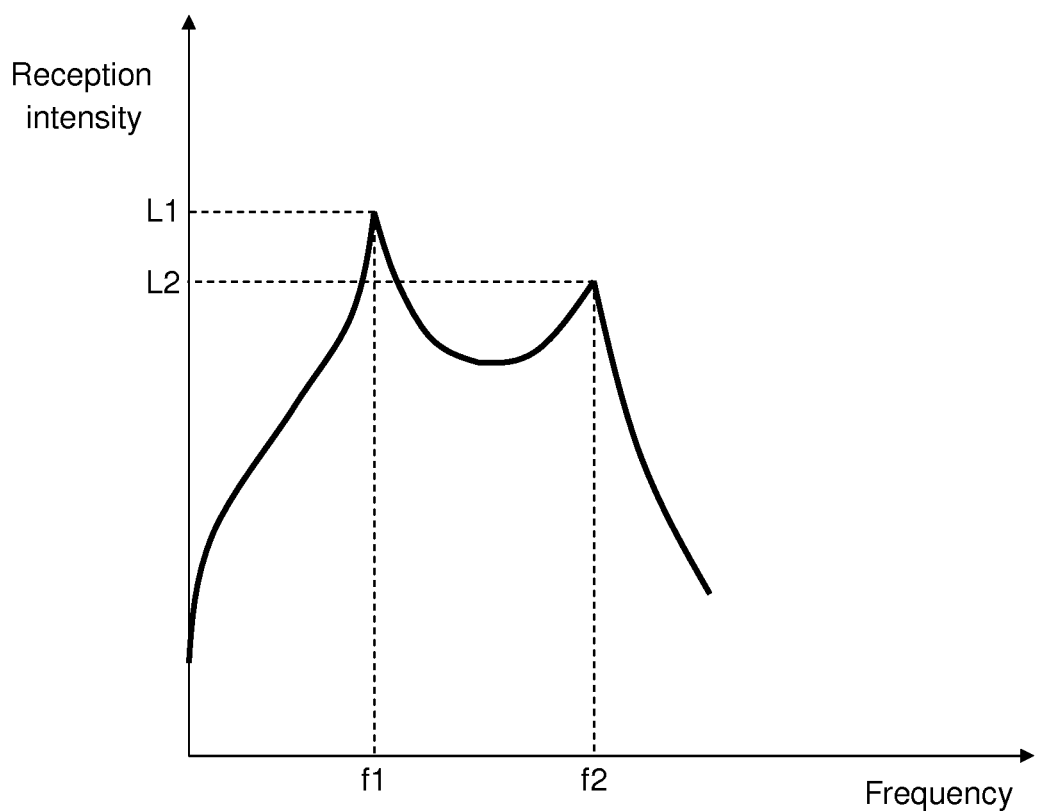
FIG. 3 is a frequency characteristic diagram of the non-contact power supply apparatus in accordance with the first exemplary embodiment.

In conventional non-contact power supply apparatus 100, insertion of foreign object 129 is detected based on foreign object detection signal PT1. Thus, foreign object 129 needs to be metal. When a living object, such as a finger, is present between power transmitting coil 123 and power receiving coil 127, foreign object detection signal PT1 transmits through the finger. Thus, the presence of a living body, such as a finger, cannot be detected as a foreign object.

First Exemplary Embodiment

Hereinafter, this exemplary embodiment is described with reference to the accompanying drawings. FIG. 1 is an exploded perspective view of non-contact power supply apparatus 11 in accordance with this exemplary embodiment. FIG. 2A is an explanatory view of receiving antennas 23 of non-contact power supply apparatus 11 in accordance with this exemplary embodiment. FIG. 2B is an explanatory view of transmitting antennas 41 of non-contact power supply apparatus 11 in accordance with this exemplary embodiment. FIG. 2C is a top view of sensor 17 of non-contact power supply apparatus 11 in accordance with this exemplary embodiment. Each of FIG. 2A through FIG. 2C is a view of sensor 17 when insulator 19 is perspectively viewed from first coil 13.

Non-contact power supply apparatus 11 includes the following elements: first coil 13 (power receiving coil); second coil 15 (power transmitting coil) opposed to first coil 13; and sensor 17. Sensor 17 includes the following elements: insulator 19; transmitting main antenna parts 43; transmitting sub antenna parts 45; transmitting circuit 21; receiving main antenna parts 27; receiving sub antenna parts 29; and receiving circuit 25. Insulator 19 is disposed between first coil 13 and second coil 15. Each of transmitting main antenna parts 43 is formed, in a straight shape, on the first face (back side) of insulator 19. Each of transmitting sub antenna parts 45 is formed on the first face of insulator 19, intersects the corresponding one of transmitting main antenna parts 43, and is electrically connected thereto. Transmitting circuit 21 is electrically connected to transmitting main antenna parts 43, and transmits a signal to each of transmitting main antenna parts 43. Each of receiving main antenna parts 27 is formed, in a straight shape, on the second face (front side), which is opposite the first face, of insulator 19. Each of receiving sub antenna parts 29 is formed on the second face of insulator 19, intersects the corresponding one of receiving main antenna parts 27, and is electrically connected thereto. Receiving circuit 25 is electrically connected to receiving main antenna parts 27. Receiving circuit 25 receives the signal through receiving main antenna parts 27 and receiving sub antenna parts 29, and senses an object except insulator 19 between first coil 13 and second coil 15, based on a change in the characteristic of the signal received.

Hereinafter, a specific description is provided for the configuration and operation of non-contact power supply apparatus 11 of this exemplary embodiment. With reference to FIG. 1, first coil 13 for receiving electric power is configured by providing a spiral groove in first holder 31 made of resin, for example, inserting a litz wire in the groove, and forming a spiral coil. First coil 13 is electrically connected to power receiving circuit 33. Power receiving circuit 33 converts the electric power from first coil 13 into the electric power suitable for a load (not shown). The load is not limited to the load consuming electric power, and may be a secondary battery for storing electric power, for example.

Second coil 15 is opposed to first coil 13. Second coil 15 is configured by inserting a litz wire into a groove in second holder 34 made of resin and forming a spiral coil. Second coil 15 is electrically connected to power transmitting circuit

35. Power transmitting circuit 35 generates electric power to be transmitted from second coil 15 to first coil 13. Power transmitting circuit 35 has a function of converting the waveforms of the system power supply to the alternating current waveforms suitable for power transmission.

As shown by the broken line and double-pointed arrow 30 in FIG. 1, wireless information is exchanged between power receiving circuit 33 and power transmitting circuit 35. Thus, power receiving circuit 33 outputs, to power transmitting circuit 35, a request for power transmission and the information on the voltage and electric current of power receiving circuit 33, for example. Power transmitting circuit 35 informs power receiving circuit 33 of the start and stop of power transmission. Such information is exchanged using data signals.

Insulator 19 is disposed between first coil 13 and second coil 15. That is, first coil 13 is disposed above second coil 15 with insulator 19 interposed therebetween. Second coil 15 is disposed on the floor, for example.

Sensor 17 includes the following elements: plate-like insulator 19; transmitting antennas 41 disposed on the first face (back side) of insulator 19; receiving antennas 23 disposed on the second face (front side) of insulator 19; transmitting circuit 21; and receiving circuit 25.

In this exemplary embodiment, glass epoxy based printed circuit board is used as insulator 19. Receiving antennas 23 and transmitting antennas 41 are formed of electrode patterns. However, receiving antennas 23 and transmitting antennas 41 are not limited to the form of electrode patterns, and may be formed of metal wires, for example. However, to reduce the thickness, electrode patterns are preferable.

Each of receiving antennas 23 is formed of receiving main antenna part 27 in a straight shape and a plurality of receiving sub antenna parts 29. A plurality of receiving main antenna parts 27 is formed parallel to each other. The plurality of receiving sub antenna parts 29 intersects the corresponding one of receiving main antenna parts 27 and is electrically connected thereto. Each of receiving sub antenna parts 29 is formed shorter than the corresponding one of receiving main antenna parts 27 and not to overlap the adjacent ones of receiving main antenna parts 27. Each of receiving main antenna parts 27 is electrically connected to receiving circuit 25. In the first exemplary embodiment, each of receiving main antenna parts 27 perpendicularly intersects the corresponding ones of receiving sub antenna parts 29.

Each of transmitting antennas 41 is formed of transmitting main antenna part 43 in a straight shape and a plurality of transmitting sub antenna parts 45. A plurality of transmitting main antenna parts 43 is formed parallel to each other. The plurality of transmitting sub antenna parts 45 intersects the corresponding one of transmitting main antenna parts 43 and is electrically connected thereto. Each of transmitting sub antenna parts 45 is formed shorter than the corresponding one of transmitting main antenna parts 43 and not to overlap the adjacent ones of transmitting main antenna parts 43. Each of transmitting main antenna part 43 is electrically connected to transmitting circuit 21. In the first exemplary embodiment, each of transmitting main antenna parts 43 perpendicularly intersects the corresponding ones of transmitting sub antenna parts 45.

Connection ends 39 are formed along one side of insulator 19 on the first face (back side) and the second face (front side). Connection ends 39 on the first face are electrically connected to connection ends 39 on the second face by through-holes filled with conductive material. One end of each of receiving main antenna parts 27 is connected to the corresponding one of connection ends 39 on the second face (front side) of insulator 19. Receiving circuit 25 is electrically connected to connection ends 39 on the first face (back side) by wiring. Here, receiving circuit 25 may be connected to connection ends 39 on the second face (front side) of insulator 19. However, to prevent the wiring from appearing on the surface of insulator 19, the receiving circuit is preferably connected to the connection ends on the first face of insulator 19.

In this exemplary embodiment, to reduce the effect of electric field coupling in transmitting main antenna parts 43 and receiving main antenna parts 27, transmitting main antenna parts 43 and receiving main antenna parts 27 are formed non-parallel to each other. Specifically, in this exemplary embodiment, to minimize the effect of electric field coupling, transmitting main antenna parts 43 and receiving main antenna parts 27 are formed orthogonal to each other.

Transmitting circuit 21 is electrically connected to power transmitting circuit 35. Before starting power transmission, for example, power transmitting circuit 35 outputs detection start signal Tx to transmitting circuit 21. In response to this signal, transmitting circuit 21 outputs a predetermined signal to transmitting antennas 41. The examples of the signal include an electromagnetic field formed in the vicinity of transmitting antennas 41 (including the back side of insulator 19).

Receiving circuit 25 is electrically connected to power transmitting circuit 35. Through receiving antennas 23, receiving circuit 25 receives the signal output from transmitting circuit 21 through transmitting antennas 41, and determines whether a foreign object is present, based on a change in reception intensity. Each of the receiving antennas receives a change in electromagnetic field, as a signal. At this time, the reception intensity indicates the strength of the electromagnetic field. Then, receiving circuit 25 outputs the result to power transmitting circuit 35. Power transmitting circuit 35 controls power transmission, based on the result from receiving circuit 25.

Next, the configuration of sensor 17 is detailed with reference to FIG. 2C. FIG. 2C is a top view of sensor 17 of non-contact power supply apparatus 11 in accordance with the first exemplary embodiment. Receiving antennas 23 on the top face of insulator 19 are shown by solid lines. Transmitting antennas 41 on the bottom face of insulator 19 are shown by broken lines.

As shown in FIG. 2C, receiving sub antenna parts 29 and transmitting sub antenna parts 45 are formed so as not to overlap and to be orthogonal to each other when insulator 19 is viewed from the top face (i.e. from first coil 13).

Even when receiving sub antenna parts 29 overlap transmitting sub antenna parts 45, a foreign object can be sensed. However, when receiving sub antenna parts 29 overlap transmitting sub antenna parts 45, the electric field coupling in the overlapping portion is strong. Thus, when a foreign object is present in sensor 17, a change in signal characteristics (sensitivity) is small. When a foreign object extends over receiving sub antenna parts 29 and transmitting sub antenna parts 45, sensitivity sufficient to detect a change in signal characteristics can be ensured. Thus, it is preferable that receiving sub antenna parts 29 and transmitting sub antenna parts 45 are formed so as not to overlap but to be close to each other.

Next, a description is provided for the frequency characteristic of this exemplary embodiment with reference to FIG. 3. FIG. 3 is a frequency characteristic diagram of non-contact power supply apparatus 11 in accordance with the first exemplary embodiment. In FIG. 3, the horizontal axis shows a frequency and the vertical axis shows a reception intensity.

As shown in FIG. 3, in the frequency characteristic with respect to reception intensity, two resonance frequencies are present. In this exemplary embodiment, these two resonance frequencies are used to sense a foreign object. At frequencies higher than f2, resonance frequencies at which reception intensities are low are present. However, at frequencies higher than f2, low reception intensity considerably decreases the sensitivity of the signal characteristics to a foreign object. Thus, in the first exemplary embodiment, a filtering circuit (not shown) included in receiving circuit 25 removes the high-frequency band.

As shown in FIG. 3, major two resonance frequencies are present because transmitting antennas 41 have main antenna parts 43 and sub antenna parts 45 and receiving antennas 23 have main antenna parts 27 and sub antenna parts 29. Main antenna parts 27, 43 indicate receiving main antenna parts 27 and transmitting main antenna parts 43. Sub antenna parts 29, 45 indicate receiving sub antenna parts 29 and transmitting sub antenna parts 45.

Resonance frequency f1 of sub antenna parts 29, 45 is lower than resonance frequency f2 of main antenna parts 27, 43. This is for the following reason. Each of main antenna parts 27 intersects a plurality of sub antenna parts 29, and each of main antenna parts 43 intersects a plurality of sub antenna parts 45. Thus, the electric field vectors of main antenna parts 27, 43 and those of respective sub antenna parts 29, 45 are cancelled out. This reduces the capacitance components of main antenna parts 27, 43. As a result, resonance frequency f2 becomes high. In contrast, in sub antenna parts 29, 45, electrical coupling in both sides of insulator 19 is strong, which increases the capacitance component. As a result, resonance frequency f1 becomes low. Consequently, resonance frequency f1 of sub antenna parts 29, 45 is lower than resonance frequency f2 of main antenna parts 27, 43.

In this exemplary embodiment, as shown in FIG. 3, reception intensity L1 of sub antenna parts 29, 45 is larger than reception intensity L2 of main antenna parts 27, 43. However, this magnitude relation may be reversed, depending on the distance between transmitting antennas 41 and receiving antennas 23, the thickness of insulator 19, or the like.

Figure 4:
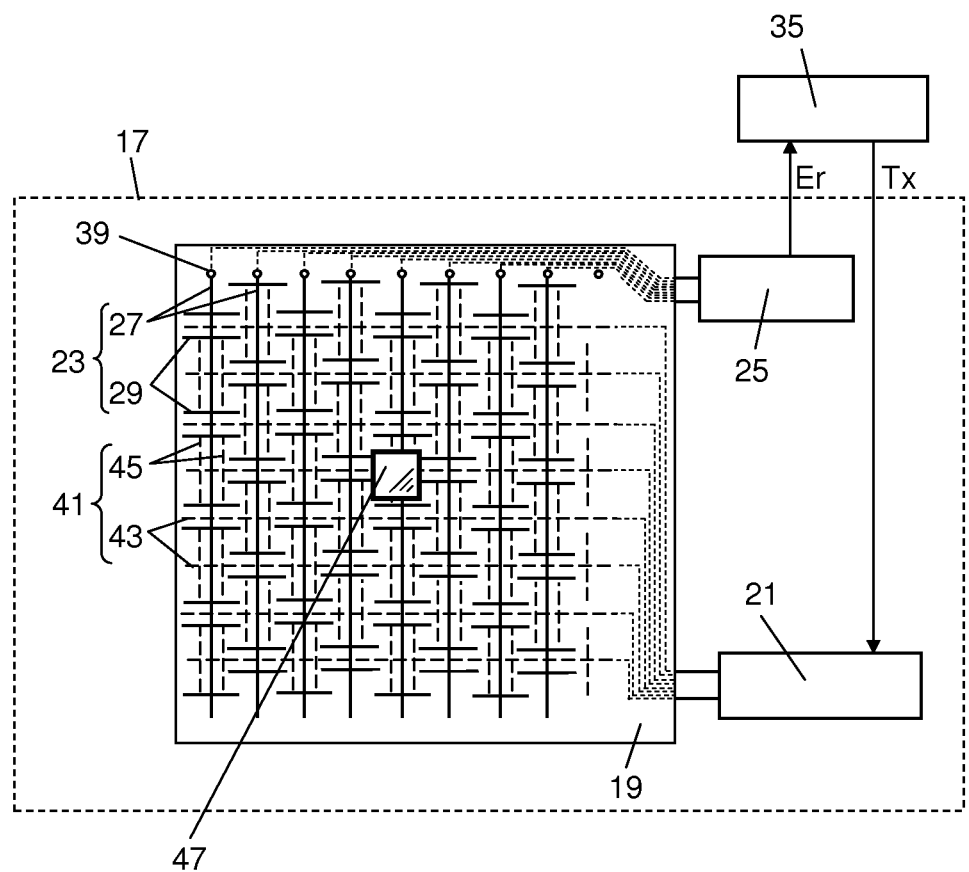
FIG. 4 is a top view of the sensor of the non-contact power supply apparatus when a metallic foreign object is present in accordance with the first exemplary embodiment.
Figure 5:
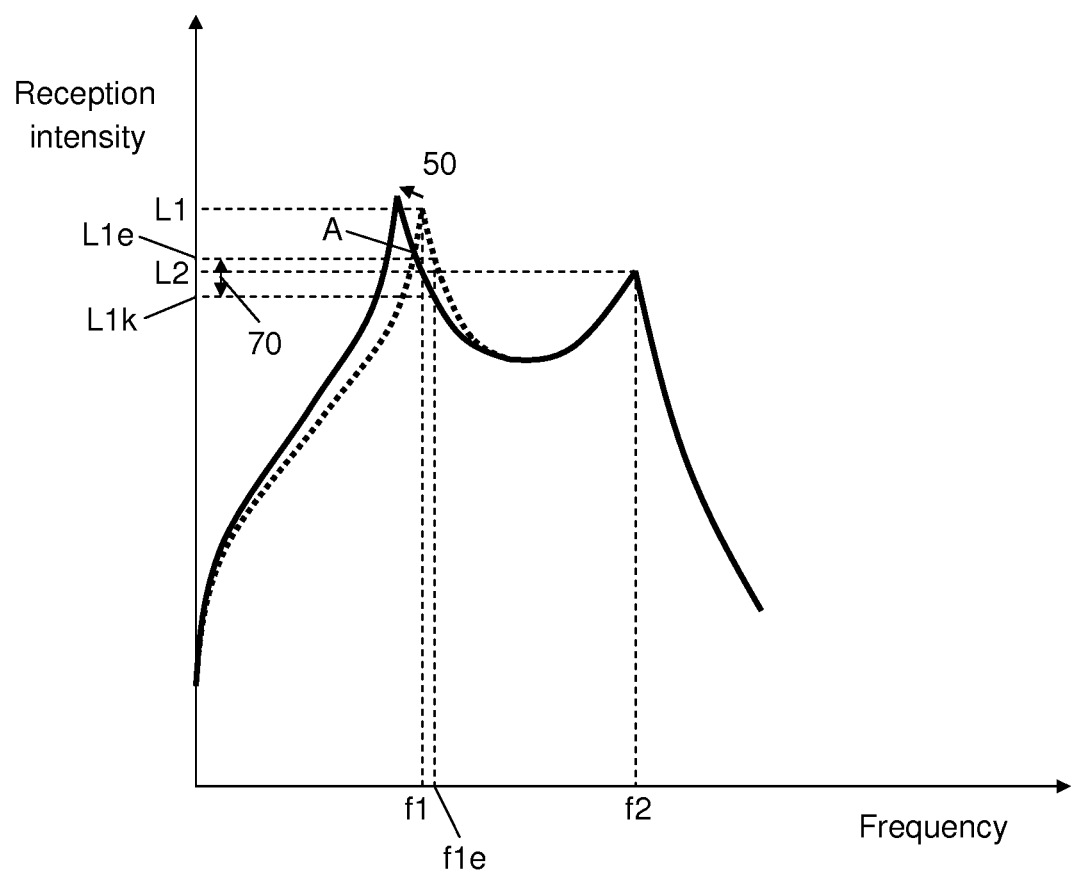
FIG. 5 is a frequency characteristic diagram of the non-contact power supply apparatus in accordance with the first exemplary embodiment.

Next, a description is provided for a case where small metallic foreign object 47 is present with reference to FIG. 4 and FIG. 5. FIG. 4 is a top view of sensor 17 of non-contact power supply apparatus 11 when metallic foreign object 47 is present. FIG. 5 is a frequency characteristic diagram of non-contact power supply apparatus 11 in accordance with this exemplary embodiment. In FIG. 5, the horizontal axis shows a frequency and the vertical axis shows a reception intensity. The solid line shows a frequency characteristic when metallic foreign object 47 is present, and the broken line shows a frequency characteristic when no foreign object is present. Thus, the broken line in FIG. 5 shows the frequency characteristic the same as that shown by the solid line in FIG. 3.

Here, metallic foreign object 47 is assumed to be smaller than a square foreign object whose side is approximately 2 cm to 3 cm. This exemplary embodiment shows an example where a copper plate of approximately 1 cm square is present as metallic foreign object 47. The shape of metallic foreign object 47 may be a polygon, disc, sphere, and rod, in addition to a square.

Before starting power transmission, power transmitting circuit 35 outputs detection start signal Tx to transmitting circuit 21. Upon receiving detection start signal Tx, transmitting circuit 21 outputs, to each of transmitting main antenna parts 43 of transmitting antennas 41, a signal including resonance frequency f1 and resonance frequency f2. Thus, a signal including resonance frequency f1 and resonance frequency f2 is output from each of transmitting antennas 41.

The signal output from transmitting antennas 41 is received by each of receiving antennas 23 and output to receiving circuit 25. Receiving circuit 25 has stored a value of reception intensity L1e at a frequency when metallic foreign object 47 is not present (first detection frequency f1e). Receiving circuit 25 compares the stored reception intensity (signal characteristics) at first detection frequency f1e with the reception intensity of the currently receiving signal at first detection frequency f1e. As this comparing operation, a reference voltage corresponding to the value of reception intensity L1e may be stored as a resistance value in voltage division, for example, and compared in an analog circuit using a comparator. Alternatively, the value of reception intensity L1e may be stored in a memory and compared in a digital circuit using software in a microcomputer.

When metallic foreign object 47 is not present, reception intensity L1e does not change. In this case, receiving circuit 25 outputs, to power transmitting circuit 35, a signal that indicates the absence of metallic foreign object 47.

In contrast, when metallic foreign object 47 is present, the electric field coupling between transmitting sub antenna parts 45 and receiving sub antenna parts 29 in a portion that overlaps metallic foreign object 47 becomes strong. This increases the capacitance component.

Since metallic foreign object 47 of approximately 1 cm square is small, the metallic foreign object hardly affects the electric field coupling in main antenna parts 27, 43. Thus, as shown in FIG. 5, reception intensity L2 at resonance frequency f2 in main antenna parts 27, 43 is almost unchanged. However, in sub antenna parts 29, 45, the electric field coupling between transmitting sub antenna parts 45 and receiving sub antenna parts 29 becomes strong. As a result, the capacitance component increases; thus resonance frequency f1 in sub antenna parts 29, 45 decreases as shown by arrow 50 in FIG. 5. At the same time, reception intensity L1 slightly increases. Thus, by detecting such a change, the presence of metallic foreign object 47 can be sensed. However, measuring all frequency characteristics shown in FIG. 5 requires complicated circuitry. Then, in this exemplary embodiment, as the change in the signal characteristics, a change in the reception intensity at first detection frequency f1e in sub antenna parts 29, 45 is detected.

Hereinafter, a detection method is detailed. The reception intensity at first detection frequency f1e is prestored in the memory (not shown) included in receiving circuit 25. In this exemplary embodiment, as first detection frequency f1e, a frequency higher than resonance frequency f1 is set.

Comparison between the solid line and the broken line in FIG. 5 shows that the changes in the reception intensity in the vicinity of resonance frequency f1 are large. However, in FIG. 5, the solid line crosses the broken line at A point, at which the frequency is slightly lower than resonance frequency f1. That is, the reception intensity at the frequency of A point hardly changes regardless of whether metallic foreign object 47 is present or not. Thus, at the frequency of A point, whether metallic foreign object 47 is present cannot be determined. Therefore, if a frequency equal to or lower than resonance frequency f1 is set to first detection frequency f1e, fluctuations in resonance frequency f1, for example, can make first detection frequency f1e equal to the frequency at A point. Thus, it is possible that metallic foreign object 47 cannot be sensed. Then, in this exemplary embodiment, first detection frequency f1e is preset to a frequency higher than resonance frequency f1. Even when resonance frequency f1 slightly fluctuates, this setting can reduce the possibility that the reception intensity reaches A point. In FIG. 5, the difference of the change in the reception intensity at first detection frequency f1e is shown by double-pointed arrow 70.

However, first detection frequency f1e may be set to a frequency lower than the frequency at A point at which the reception intensity does not reach A point even when resonance frequency f1 slightly fluctuates. However, in this case, as obvious from FIG. 5, as first detection frequency f1e becomes lower than frequency f1, the reception intensity rapidly decreases; thus the sensitivity of sensing foreign objects decreases. Therefore, first detection frequency f1e is preferably set to a frequency higher than resonance frequency f1.

As shown in FIG. 5, when first detection frequency f1e is excessively higher than resonance frequency f1, a change in the reception intensity caused by the presence of metallic foreign object 47 becomes extremely small. Thus, it is only necessary to set first detection frequency f1e to a frequency higher than resonance frequency f1 in the range in which the sensitivity of sensing metallic foreign object 47 can be ensured.

In this exemplary embodiment, receiving circuit 25 only needs to detect a change in the reception intensity at first detection frequency f1e. Specifically, receiving circuit 25 detects reception intensity L1k at first detection frequency f1e, and determines the presence of metallic foreign object 47 when the detected reception intensity is different from reception intensity L1e stored in the memory. As a result, metallic foreign object 47 can be sensed with a simple circuit configuration.

Thus, when a change in the reception intensity at first detection frequency f1e is sensed, receiving circuit 25 transmits foreign object signal Er to power transmitting circuit 35. When receiving foreign object signal Er, power transmitting circuit 35 does not start power transmission and gives a warning. Thus, the presence of metallic foreign object 47 can be sensed before power transmission. This can prevent heat generation caused by metallic foreign object 47.

In this exemplary embodiment, the presence of metallic foreign object 47 is determined based on a change in reception intensity L1, but may be determined based on a change in resonance frequency f1.

Reception intensity L1 changes depending on the size of metallic foreign object 47, the space between sub antenna parts 29, the space between sub antenna parts 45, or the like. Thus, by obtaining the correlation between the amount of change in reception intensity L1 and the size of metallic foreign object 47 in advance, the size of metallic foreign object 47 can be determined. Alternatively, depending on the size of metallic foreign object 47 to be detected, the space between sub antenna parts 29 and the space between sub antenna parts 45 may be determined.

Figure 6:
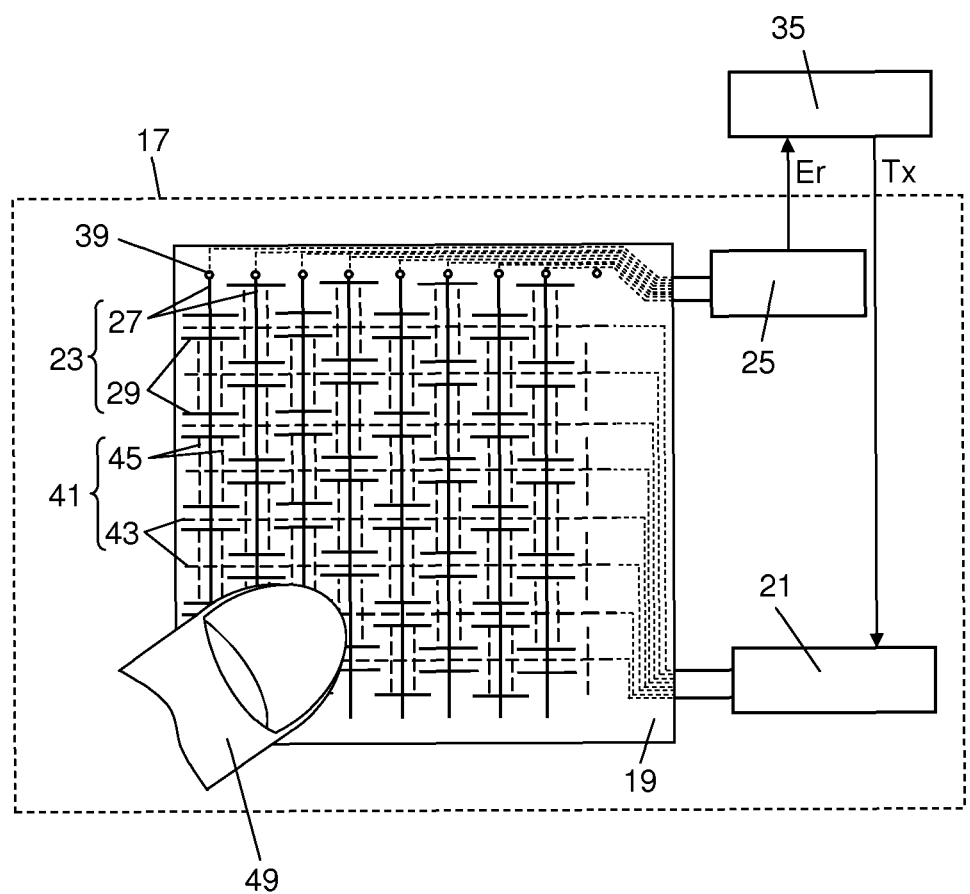
FIG. 6 is a top view of the sensor of the non-contact power supply apparatus when a finger approaches in accordance with the first exemplary embodiment.
Figure 7:
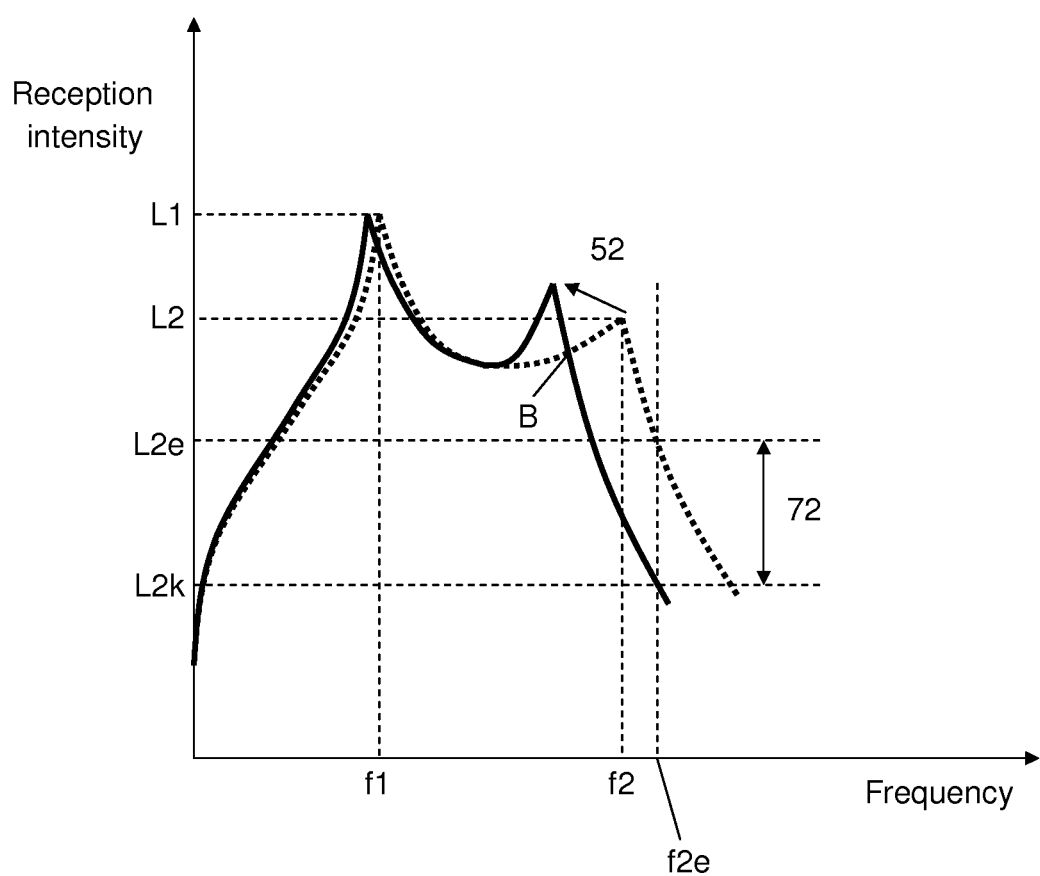
FIG. 7 is a frequency characteristic diagram of the non-contact power supply apparatus in accordance with the first exemplary embodiment.

Next, with reference to FIG. 6 and FIG. 7, a description is provided for the operation of non-contact power supply apparatus 11 when a living body approaches sensor 17. FIG. 6 is a top view of sensor 17 of non-contact power supply apparatus 11 when finger 49 approaches. FIG. 7 is a frequency characteristic diagram of non-contact power supply apparatus 11 in accordance with this exemplary embodiment. In FIG. 7, the horizontal axis shows a frequency and the vertical axis shows a reception intensity. The solid line shows a frequency characteristic when finger 49 approaches and the broken line shows a frequency characteristic when finger 49 does not approach. Thus, the broken line in FIG. 7 shows the frequency characteristic the same as that shown by the solid line in FIG. 3.

In order to sense a living body, power transmitting circuit 35 outputs detection start signal Tx to transmitting circuit 21. Upon receiving detection start signal Tx, transmitting circuit 21 outputs a signal including resonance frequency f1 and resonance frequency f2 from each of transmitting antennas 41.

The signal is detected by each of receiving antennas 23 and output to receiving circuit 25. Based on the characteristics of the detected signal, receiving circuit 25 determines whether a living body is present.

Finger 49 is grounded via the human body. Thus, as finger 49 is approaching receiving antennas 23, the capacitance between the tip of finger 49 and receiving antennas 23 changes. This change in the capacitance affects the signal characteristics of main antenna parts 27, 43 more than those of sub antenna parts 29, 45. This is because each of main antenna parts 27, 43 is longer than the corresponding one of sub antenna parts 29, 45, and thus has an area larger than that of the latter one.

When the capacitance changes, as shown by arrow 52 in FIG. 7, resonance frequency f2 of main antenna parts 27, 43 is decreased and reception intensity L2 thereof is increased by the approach of finger 49. Thus, by detecting the changes in the signal characteristics, the approach of finger 49 can be determined. However, measuring all the frequency characteristics shown in FIG. 7 requires complicated circuitry. Thus, in this exemplary embodiment, as the change in the signal characteristics, a change in the reception intensity at second detection frequency f2e in main antenna parts 27, 43 is detected.

Hereinafter, a detection method is detailed. The reception intensity at second detection frequency f2e is prestored in the memory (not shown) included in receiving circuit 25. In this exemplary embodiment, as second detection frequency f2e, a frequency higher than resonance frequency f2 is set.

Comparison between the solid line and the broken line in FIG. 7 shows that the changes in the reception intensity in the vicinity of resonance frequency f2 are large. However, in FIG. 7, the solid line crosses the broken line at B point, at which the frequency is lower than resonance frequency f2. That is, the reception intensity at the frequency of B point hardly changes regardless of whether finger 49 is present or not. Thus, at the frequency at B point, whether finger 49 is present cannot be determined. Therefore, if a frequency equal to or lower than resonance frequency f2 is set to second detection frequency f2e, fluctuations in resonance frequency f2, for example, can make second detection frequency f2e equal to the frequency at B point. Thus, it is possible that finger 49 cannot be sensed. Then, in this exemplary embodiment, second detection frequency f2e is preset to a frequency higher than resonance frequency f2. Even when resonance frequency f2 slightly fluctuates, this setting can reduce the possibility that the reception intensity reaches B point. In FIG. 7, the difference of the change in the reception intensity at second detection frequency f2e is shown by double-pointed arrow 72.

However, second detection frequency f2e may be set to a frequency lower than the frequency at B point at which the reception intensity does not reach B point even when resonance frequency f2 slightly fluctuates. However, in this case, as obvious from FIG. 7, as second detection frequency f2e becomes lower than the frequency at B point, the difference between the solid line and the broken line, i.e. the width shown by double-pointed arrow 72 (sensitivity) in FIG. 7, is decreased. Therefore, second detection frequency f2e is preferably set to a frequency higher than resonance frequency f2.

As shown in FIG. 7, when second detection frequency f2e is excessively higher than resonance frequency f2, the reception intensity rapidly decreases. Thus, it is only necessary to set second detection frequency f2e to a frequency higher than resonance frequency f2 in the range in which the reception intensity for sensing finger 49 can be ensured.

In this exemplary embodiment, a change in the reception intensity at second detection frequency f2e only needs to be detected. Specifically, receiving circuit 25 detects reception intensity L2k at second detection frequency f2e, and determines that finger 49 approaches when the detected reception intensity is different from reception intensity L2e stored in the memory. As a result, finger 49 can be sensed with a simple circuit configuration.

Thus, when a change in the reception intensity at second detection frequency f2e is sensed, receiving circuit 25 transmits foreign object signal Er to power transmitting circuit 35. When receiving foreign object signal Er, power transmitting circuit 35 does not start power transmission and warns that finger 49 is approaching.

In contrast, when the reception intensity at resonance frequency f2 remains unchanged, receiving circuit 25 determines that finger 49 is not approaching and informs power transmitting circuit 35 of the determination. Power transmitting circuit 35 determines that finger 49 is not approaching sensor 17, and starts power transmission.

Here, the approach of finger 49 is determined based on a change in reception intensity L2, but may be determined based on a change in resonance frequency f2.

The reception intensity changes in accordance with the distance between finger 49 and sensor 17. Thus, the following configuration may be used. The distance of finger 49 to the sensor at which no power transmission is performed is predetermined, and reception intensity L2k at the distance is obtained.

This exemplary embodiment describes an example where finger 49 (a living body) is sensed at second detection frequency f2e. However, not only finger 49 but also a large metallic foreign object can be sensed in a similar manner. For instance, suppose a metallic foreign object larger than small metallic foreign object 47 or a metallic foreign object larger than the space between the electrodes of main antenna parts 27 and the space between the electrodes of main antenna parts 43 is present. In this case, changes in the electric field coupling caused by main antenna parts 27, 43 are dominant over changes in the electric field coupling caused by sub antenna parts 29, 45. Thus, when a large metallic foreign object is inserted, a change in the frequency characteristic with respect to reception intensity is as shown in FIG. 7. Therefore, similarly to the operation of sensing finger 49, a large metallic foreign object can be sensed. Here, both of finger 49 and a large metallic foreign object exhibit the change in the frequency characteristic with respect to the reception intensity shown in FIG. 7. Thus, when the sensitivities of both of a finger and a large foreign object are the same, it is difficult to distinguish one from the other in sensing. However, since power transmitting circuit 35 does not start power transmission when finger 49 or a large metallic foreign object is present, the need for distinguishing one from the other is low.

As described above, electric field coupling in sub antenna parts 29, 45 is changed mainly by small metallic foreign object 47. This changes resonance frequency f1 and reception intensity L1 in receiving sub antenna parts 29 in the characteristics of the signal received by receiving antennas 23. At this time, resonance frequency f2 and reception intensity L2 in receiving main antenna parts 27 are almost unchanged.

Electric field coupling in main antenna parts 27, 43 is changed mainly by a large metallic foreign object or the approach of a living body. This changes resonance frequency f2 and reception intensity L2 in receiving main antenna parts 27 in the characteristics of the signal received by receiving antennas 23. Thus, in this exemplary embodiment, both of a metallic foreign object and a living body can be sensed with high accuracy.

Some foreign objects change the reception intensity in both of receiving main antenna parts 27 and receiving sub antenna parts 29. In this case, the reception intensity at first detection frequency f1e and the reception intensity at second detection frequency f2e may be sensed.

In this exemplary embodiment, a foreign object is sensed before power transmission, but may be sensed during power transmission. However, when the signal characteristics for foreign object sensing are affected by electromagnetic waves caused by power transmission, the threshold of foreign object determination (reception intensity L1k or reception intensity L2k) needs to be changed. Further, in order to enhance sensing accuracy, it is preferable to design the frequency at which transmitting antennas 41 and transmitting circuit 21 transmit electric power is far from resonance frequencies f1 and f2. Further, transmitting circuit 25 preferably includes a filtering circuit that attenuates the frequencies excluding the range from the vicinity of resonance frequency f1 to the vicinity of resonance frequency f2.

In this exemplary embodiment, foreign object sensing is performed only once, but may be performed a plurality of times. This can further enhance the accuracy of foreign object sensing. Alternatively, the sensitivities obtained by a plurality of times of foreign object sensing may be added for determination of whether a foreign object is present. This operation allows a foreign object to be sensed with high accuracy even when the sensitivity is low.

Alternatively, when the result of a plurality of times of foreign object sensing shows that a change in the signal characteristics has approached the level of foreign object sensing (e.g. reception intensity L2k), it may be determined that a foreign object, such as finger 49, is approaching sensor 17. Specifically, receiving circuit 25 senses a foreign object a plurality of times, and the change in the distance between the foreign object and sensor 17 is obtained from the amount of change in reception intensity. Then, when the reception intensity has approached the level of foreign object sensing (e.g. reception intensity L2k), receiving circuit 25 determines that a foreign object approaches and does not start power transmission. With this configuration, the approach of a foreign object can be predicted; thus the sensing accuracy is enhanced. Therefore, the possibility of entry of a foreign object immediately after the start of power transmission can be made lower than the case where foreign object sensing is performed only once before the start of power transmission.

In this exemplary embodiment, receiving antennas 23 and transmitting antennas 41 are formed in electrode patterns on the respective sides of insulator 19 made of a printed circuit board. However, this exemplary embodiment is not limited to this configuration. For instance, receiving antennas 23 and transmitting antennas 41 may be configured in the following manner. A ceramic substrate is used as insulator 19 and, as the receiving antennas and the transmitting antennas, electrode patterns are printed on the respective sides. In this case, the impact resistance of insulator 19 made of a ceramic substrate can be smaller than that of a glass epoxy based printed circuit board. However, the thermal expansion coefficient of a ceramic substrate is smaller than that of a printed circuit board. Thus, changes in ambient temperature are unlikely to cause the displacement of electrode patterns. Thus, foreign objects can be sensed with high accuracy.

Further, sensor 17 may have a laminate structure composed of a lower electrode, an insulating layer, and an upper layer. In this case, the lower electrode forms transmitting antennas 41, the insulating layer forms insulator 19, and the upper electrode forms receiving antennas 23. This structure can reduce the thickness of insulator 19, thus enhancing the sensitivity of sensing foreign objects. The laminate structure may be a laminate configuration using resin or a laminate configuration using ceramic. Insulator 19 may also have a laminate structure.

In this exemplary embodiment, each of main antenna parts 27 perpendicularly intersects the corresponding ones of sub antenna parts 29 and each of main antenna parts 43 perpendicularly intersects the corresponding ones of sub antenna parts 45. However, this exemplary embodiment is not limited to this configuration. Each of main antenna parts 27 may intersect the corresponding ones of sub antenna parts 29 at an angle except right angles so that sub antenna parts 29 do not overlap each other. Each of main antenna parts 43 may intersect the corresponding ones of sub antenna parts 45 at an angle except right angles so that sub antenna parts 45 do not overlap each other. Alternatively, each of sub antenna parts 29, 45 may form a V shape with the corresponding one of main antenna parts 27, 43 set as the axis of symmetry. However, in these configurations, the sensitivity of sensing metallic foreign object 47 can be decreased at some intersecting angles. Thus, it is only necessary to set the angle appropriately within the range in which preferable sensing sensitivity can be ensured.

In this exemplary embodiment, receiving main antenna parts 27 and transmitting main antenna parts 43 are disposed so as to form the right angles each other with insulator 19 interposed therebetween. However, this exemplary embodiment is not limited to this configuration. An angle except the right angles may be used. However, at an angle except the right angles, the effect of electric field coupling between the receiving main antenna parts and the transmitting main antenna parts becomes large and is the largest at an angle of 0° (receiving and transmitting main antenna parts being parallel to each other). As a result, the sensitivity of sensing foreign objects is decreased. Thus, preferably, receiving main antenna parts 27 and transmitting main antenna parts 43 are disposed so as to form the right angles each other.

Alternatively, receiving main antenna parts 27 and transmitting main antenna parts 43 may be disposed parallel to each other with large spaces provided therebetween so that the effect of the electric field coupling between the receiving main antenna parts and the transmitting main antenna parts raises no problem. In this case, although the sensitivity is decreased as described above, foreign object sensing is possible. With this configuration, receiving antennas 23 and transmitting antennas 41 can be formed on the same side (one face). This configuration simplifies the structure of sensor 17. Alternatively, on both sides of insulator 19, both receiving main antenna parts 27 and transmitting main antenna parts 43 may be provided parallel to each other.

In this exemplary embodiment, a plurality of receiving main antenna parts 27 and a plurality of transmitting main antenna parts 43 are formed. However, the number of one type of main antenna part or both types of main antenna parts may be one. This simplifies the configuration of antenna parts. However, in this case, the region in which a foreign object can be sensed becomes smaller, which decreases the sensitivity of sensing foreign objects. To address this problem, the following configuration may be used. Electric power is transmitted with metallic foreign object 47 disposed on first coil 13 or second coil 15, the position of heat generation is located, and receiving main antenna part 27 and transmitting main antenna part 43 are disposed in the position.

Second Exemplary Embodiment

Non-contact power supply apparatus 11 of the second exemplary embodiment is identical in configuration to that of the first exemplary embodiment but is different in operation therefrom. Transmitting circuit 21 sequentially outputs a signal through a plurality of transmitting main antenna parts 43 and a plurality of transmitting sub antenna parts 45 of transmitting antennas 41. Receiving circuit 25 sequentially receives the signal through a plurality of receiving main antenna parts 27 and a plurality of receiving sub antenna parts 29 of receiving antennas 23. The second exemplary embodiment differs from the first exemplary embodiment in that the above operation allows sensing the position of a foreign object.

With the above operation, the user can locate the position of a foreign object; thus the removal of the foreign object is ensured. Hereinafter, this exemplary embodiment is detailed. First, transmitting circuit 21 sequentially outputs a signal to each of transmitting main antenna parts 43. That is, transmitting circuit 21 does not output a signal to the plurality of transmitting main antenna parts 43 simultaneously, but outputs a signal in a predetermined order. For instance, transmitting circuit 21 outputs a signal to the transmitting main antenna parts in the following order: from transmitting main antenna part 43 in the backmost position to transmitting main antenna part 43 in the foremost position of FIG. 2C. Here, "backmost position" means a part closest to connection ends 39, and "foremost position" means a part farthest from connection ends 39.

Each of transmitting main antenna parts 43 is connected to the corresponding ones of transmitting sub antenna parts 45; thus the signal transmitted to transmitting main antenna part 43 is also output from transmitting sub antenna parts 45. Here, the signal is first output from transmitting main antenna part 43 in the backmost position and transmitting sub antenna parts 45 connected thereto.

Receiving circuit 25 first receives the signal obtained by receiving main antenna part 27 in the rightmost position in FIG. 2C and receiving sub antenna parts 29 connected thereto. Here, the right is the direction in which wiring from transmitting main antenna parts 43 and receiving main antenna parts 27 is extended. The left is the side opposite the right.

Next, receiving circuit 25 determines whether a change in reception intensity as described in the first exemplary embodiment has occurred. When reception intensity is changed, receiving circuit 25 determines that a foreign object (e.g. metallic foreign object 47 and finger 49) is present in the vicinity of the right back in sensor 17. Then, receiving circuit 25 outputs, to power transmitting circuit 35, foreign object signal Erp including the presence of a foreign object and the information on the position of the foreign object.

In contrast, when reception intensity remains unchanged, receiving circuit 25 outputs, to power transmitting circuit 35, a signal Ern including the absence of a foreign object in the vicinity of the right back and position information.

Next, receiving circuit 25 receives the signal obtained by receiving main antenna part 27 in the second rightmost position and receiving sub antenna parts 29 connected thereto. Then, similarly to the above operation, the receiving circuit determines whether a foreign object is present, and transmits, to power transmitting circuit 35, the presence or absence of a foreign object and position information as foreign object signal Erp or signal Ern.

Thus, transmitting circuit 25 repeats the operation similar to the above until the operation reaches receiving main antenna part 27 in the leftmost position and receiving sub antenna parts 29 connected thereto.

Next, power transmitting circuit 35 outputs detection start signal Tx to transmitting circuit 21 so that the signal is output from transmitting main antenna part 43 in the second furthest position and transmitting sub antenna parts 45 connected thereto. Thereby, transmitting circuit 21 outputs the signal through transmitting main antenna part 43 in the second furthest position and transmitting sub antenna parts 45 connected thereto.

Then, similarly to the above, receiving circuit 25 receives the signal through all receiving main antenna parts 27, from the rightmost position to the leftmost position, and receiving sub antenna parts 29 connected thereto, and transmits the presence or absence of a foreign object and position information, as foreign object signal Erp or signal Ern.

With this operation, a foreign object in the vicinity of transmitting main antenna part 43 in the second farthest position and transmitting sub antenna parts 45 connected thereto is detected.

With the above operation, at last, transmitting circuit 21 outputs the signal through transmitting antenna 41 in the foremost position, and receiving circuit 25 receives the signal through receiving antenna 23 in the leftmost position. Thereby, the receiving circuit outputs foreign object signal Erp or signal Ern to power transmitting circuit 35. Thus, the operation of sensing a foreign object is completed. In short, transmitting circuit 35 senses the presence of a foreign object by scanning insulator 19 using transmitting circuit 21 and receiving circuit 25.

Based on foreign object signal Erp and signal Ern thus obtained, power transmitting circuit 35 performs the following operation. When a foreign object is present, the power transmitting circuit does not start power transmission and transmits the position of the foreign object with a warning. When a foreign object is not sensed, power transmitting circuit 35 starts power transmission. Even when the foreign object is small, this configuration allows the user to locate the position; thus the removal of the foreign object is ensured. Further, when a plurality of foreign objects is present, the user can locate the position of each foreign object. When a large metallic foreign object is present, foreign object signal Erp can successively be obtained a plurality of times in scanning; thus the size of the foreign object can be sensed.

In the above operation, after all the scanning operations are completed, power transmitting circuit 35 determines whether power transmission is to be performed. However, after one scanning operation or a plurality of scanning operations, power transmitting circuit 35 may determine whether power transmission is to be performed.

With the above configuration and operation, the position of a foreign object can be located. Thus, even in large non-contact power supply apparatus 11, the position of a small foreign object can be located. As a result, removal of a foreign object can be ensured.

Third Exemplary Embodiment

Figure 8:
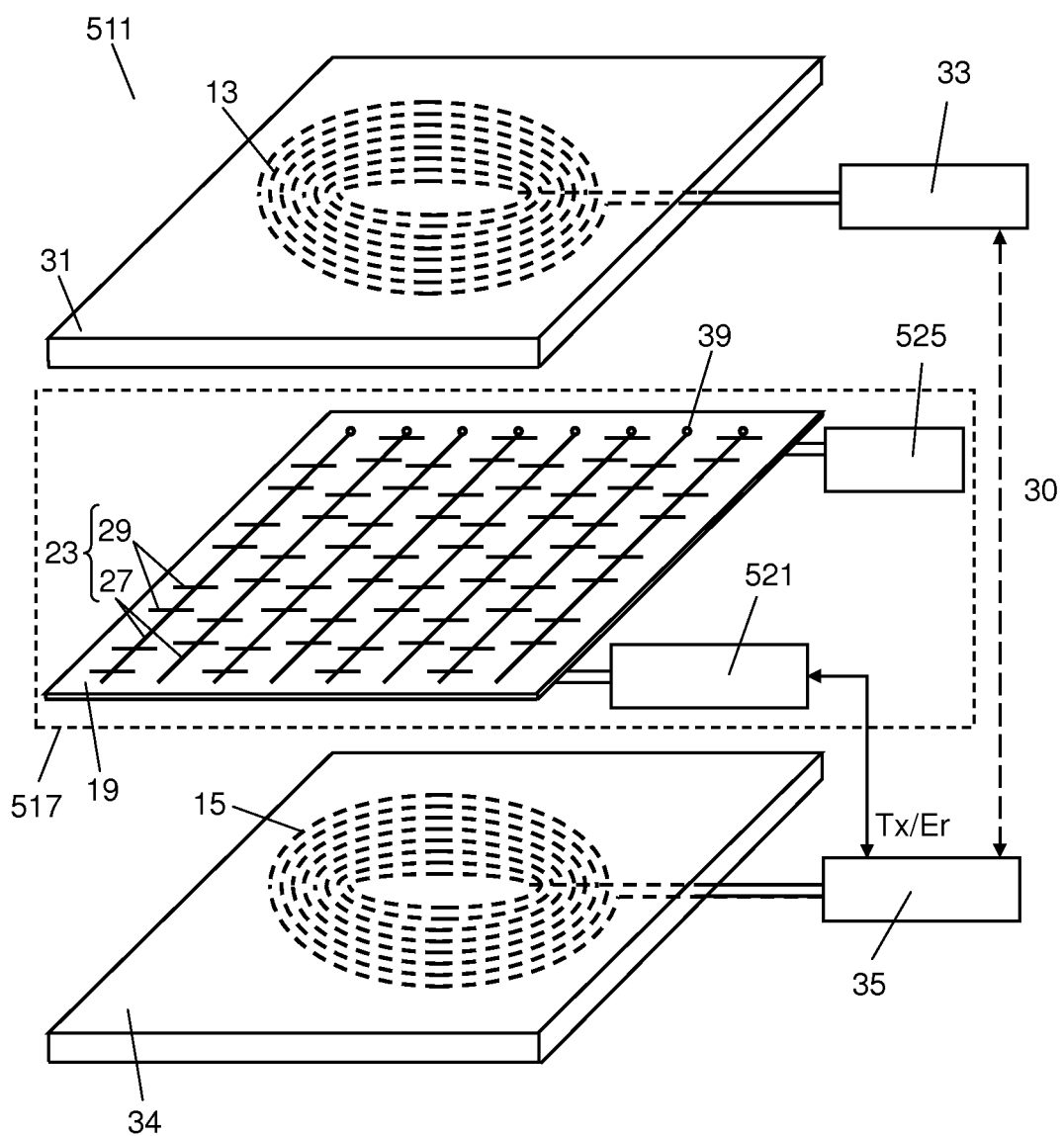
FIG. 8 is an exploded perspective view of a non-contact power supply apparatus in accordance with a third exemplary embodiment.
Figure 9:
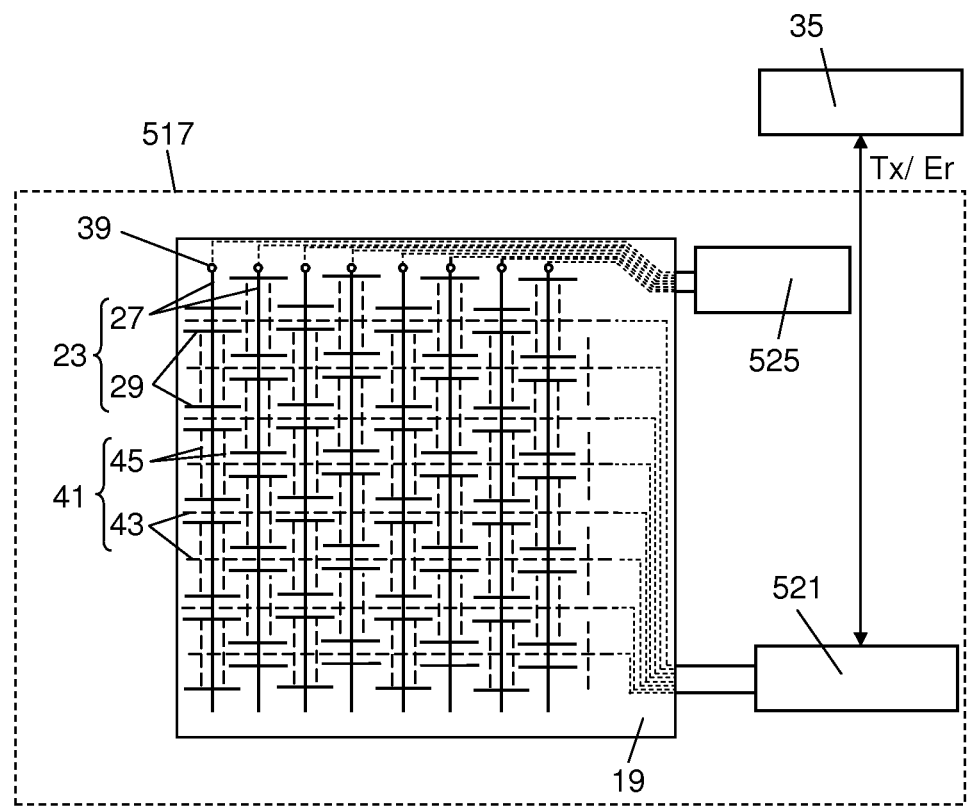
FIG. 9 is a top view of a sensor of the non-contact power supply apparatus in accordance with the third exemplary embodiment.

FIG. 8 is an exploded perspective view of non-contact power supply apparatus 511 in accordance with the third exemplary embodiment. FIG. 9 is a top view of sensor 517 of non-contact power supply apparatus 511 in accordance with the third exemplary embodiment. In the third exemplary embodiment, elements similar to those of the first exemplary embodiment have the same reference marks and the descriptions of those elements are omitted. The configuration of FIG. 8 and FIG. 9 differs from that of FIG. 1 and FIG. 2C in transmitting circuit 521 and receiving circuit 525.

Hereinafter, a description is provided for the configuration and operation of the third exemplary embodiment. In addition to the function of transmitting a signal from transmitting antennas 41 to receiving antennas 23 similarly to the first exemplary embodiment, transmitting circuit 521 receives reflection of the signal from receiving antennas 23 and receiving circuit 525 and senses a foreign object based on a change in the signal characteristics. In the third exemplary embodiment, the change in the signal characteristics is a change in the transmission power affected by the reflected wave when a signal is transmitted from transmitting antennas 41 to receiving antennas 23. The change in the transmission power is related to the change in the signal characteristics, that is, a change in reception intensity.

Transmitting circuit 521 includes the following elements: a power detecting circuit (not shown) for detecting a change in transmission power based on the reflected signal; and a microcomputer (not shown) for detecting a foreign object. As shown in FIG. 8 and FIG. 9, transmitting circuit 521 and power transmitting circuit 35 are capable of transmitting and receiving information bidirectionally. In detail, power transmitting circuit 35 outputs detection start signal Tx to transmitting circuit 521, and transmitting circuit 521 outputs foreign object signal Er to power transmitting circuit 35.

Next, receiving circuit 525 is described. One end of each of receiving main antenna parts 27 is grounded via an inductor (not shown) by wiring. Thus, receiving circuit 525 reflects the signal along with receiving antennas 23. Unlike the configuration of FIG. 1, receiving circuit 525 has no function of sensing a foreign object or outputting foreign object signal Er to power transmitting circuit 35. Thus, as shown in FIG. 8 and FIG. 9, no signal is exchanged between receiving circuit 525 and power transmitting circuit 35. The configuration other than the above is the same as that shown in FIG. 1, and FIGS. 2A through 2C.

Figure 10:
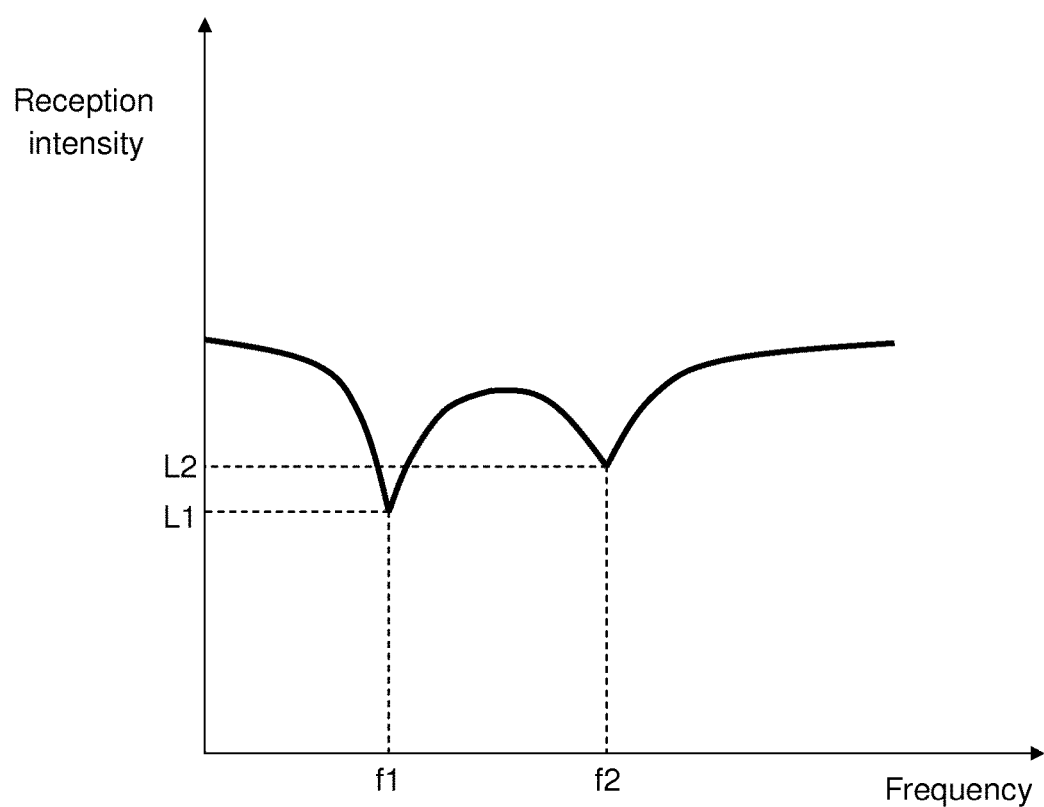
FIG. 10 is a frequency characteristic diagram of the non-contact power supply apparatus in accordance with the third exemplary embodiment.

Next, with reference to FIG. 10, a description is provided for the frequency characteristic with respect to the reception intensity of a signal each reflected from receiving antennas 23 and receiving circuit 525 in the third exemplary embodiment. FIG. 10 is a frequency characteristic diagram of non-contact power supply apparatus 511 in accordance with the third exemplary embodiment. In FIG. 10, the horizontal axis shows a frequency and the vertical axis shows a reception intensity.

Similarly to FIG. 3, two resonance frequencies to be used for foreign object sensing are present in the frequency characteristic with respect to reception strength shown in FIG. 10. However, the wave is a reflected wave and has a vertically inverted shape of the waveform in FIG. 3. That is, at two resonance frequencies f1, f2, respective reception intensities L1, L2 smaller than those in the other frequency bands are present. Also at frequencies higher than f2, resonance frequencies are present but the sensitivity to a foreign object is extremely small at those resonance frequencies. Thus, in the third exemplary embodiment, a foreign object is sensed based on changes in reception intensity only in the vicinities of resonance frequencies f1, f2, as shown in FIG. 10. The reason why major two resonance frequencies are present is the same as that of the first exemplary embodiment. The magnitude relation between reception intensities L1, L2 may be reversed, depending on the distance between transmitting antennas 41 and receiving antennas 23, the thickness of insulator 19, or the like.

Figure 11:
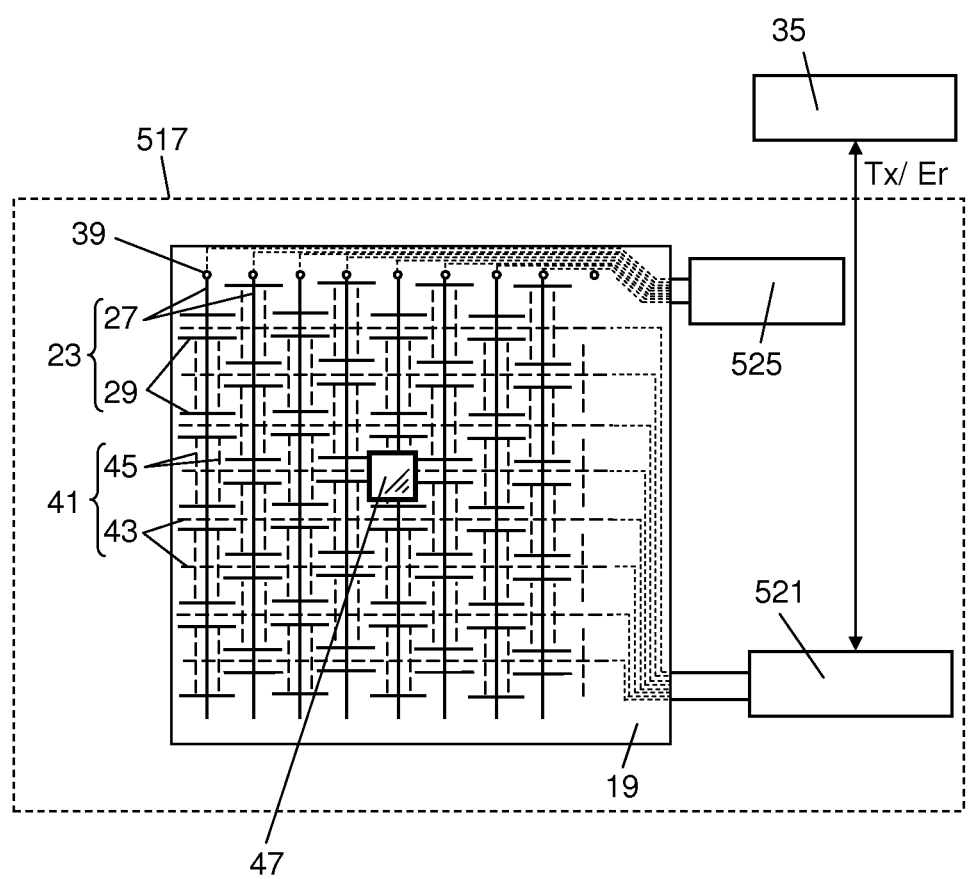
FIG. 11 is a top view of the sensor of the non-contact power supply apparatus when a metallic foreign object is present in accordance with the third exemplary embodiment.
Figure 12:
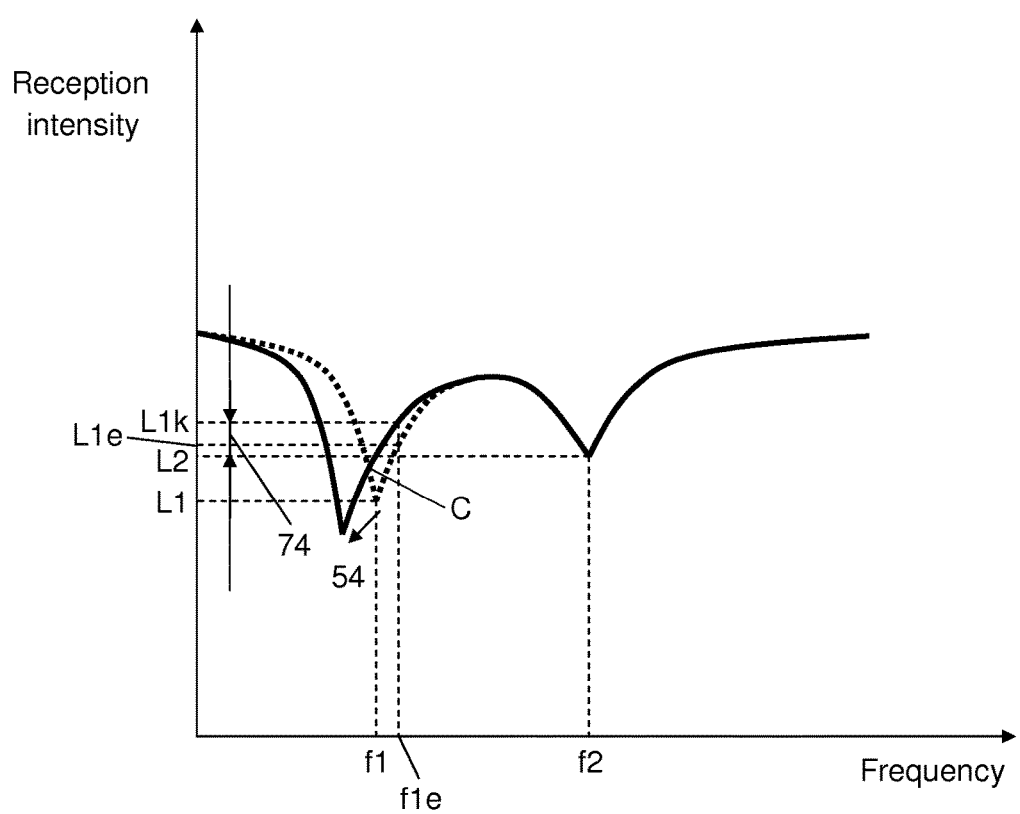
FIG. 12 is a frequency characteristic diagram of the non-contact power supply apparatus in accordance with the third exemplary embodiment.

Next, a description is provided for the operation of non-contact power supply apparatus 511. FIG. 11 is a top view of sensor 517 of non-contact power supply apparatus 511 when metallic foreign object 47 is present. FIG. 12 is a frequency characteristic diagram of non-contact power supply apparatus 511 in accordance with this exemplary embodiment. In FIG. 12, the horizontal axis shows a frequency and the vertical axis shows a reception intensity. The solid line shows a frequency characteristic when metallic foreign object 47 is present, and the broken line shows a frequency characteristic when metallic foreign object 47 is not present. Thus, the broken line in FIG. 12 shows the frequency characteristic the same as that shown by the solid line in FIG. 10.

Before starting power transmission, power transmitting circuit 35 outputs detection start signal Tx to transmitting circuit 521. Upon receiving detection start signal Tx, transmitting circuit 521 outputs, to each of transmitting main antenna parts 43 of transmitting antennas 41, a signal having resonance frequency f1 and resonance frequency f2. Thus, a signal having resonance frequency f1 and resonance frequency f2 is output from each of transmitting antennas 41.

Part of the signal thus output is reflected by the inductors of receiving antennas 23 and receiving circuit 525, and the capacitance component between transmitting antennas 41 and receiving antennas 23. This reflected wave changes transmission power. The microcomputer included in transmitting circuit 521 detects a change in the transmission power and converts the change into a change in signal characteristics, that is, a change in reception intensity.

Here, transmitting circuit 521 has stored a value of reception intensity L1e at first detection frequency f1e when metallic foreign object 47 is not present. First detection frequency f1e is a frequency higher than resonance frequency f1 as described in the first exemplary embodiment. Transmitting circuit 521 compares stored reception intensity L1e at first detection frequency f1e with present reception intensity L1k at first detection frequency f1e. When metallic foreign object 47 is not present, the reception intensity remains unchanged. Thus, receiving circuit 525 outputs, to power transmitting circuit 35, a signal that indicates the absence of metallic foreign object 47. Power transmitting circuit 35 receives the signal that indicates the absence of metallic foreign object 47.

In contrast, when metallic foreign object 47 is present, the electric field coupling between transmitting sub antenna parts 45 and receiving sub antenna parts 29 becomes strong in the portion overlapping metallic foreign object 47. This increases the capacitance component.

Since metallic foreign object 47 of approximately 1 cm square is small, as described in the first exemplary embodiment, reception intensity L2 at resonance frequency f2 in main antenna parts 27, 43 is almost unchanged. However, resonance frequency f1 in sub antenna parts 29, 45 decreases as shown by arrow 54 in FIG. 12, and reception intensity L1 therein also slightly decreases. In order to detect such a change with a simple circuit configuration, also in the third exemplary embodiment, it is preferable to detect a change in the reception intensity at first detection frequency f1e higher than resonance frequency f1 in sub antenna parts 29, 45, similarly to the first exemplary embodiment. Even when resonance frequency f1 slightly fluctuates, this setting can reduce the possibility that the reception intensity reaches C point. Here, in FIG. 12, C point is the point where the solid line crosses the broken line at which the reception intensity hardly changes regardless of whether metallic foreign object 47 is present. In FIG. 12, the difference of the change in the reception intensity at first detection frequency f1e is shown by double-pointed arrow 74.

Also in the third exemplary embodiment, similarly to the first exemplary embodiment, first detection frequency f1e may be set to a frequency lower than the frequency at C point at which the reception intensity does not reach C point even when resonance frequency f1 fluctuates. However, as obvious from FIG. 12, as first detection frequency f1e becomes lower than frequency f1, the sensitivity of sensing foreign objects is rapidly decreased. Therefore, a configuration where first detection frequency f1e is preset to a frequency higher than resonance frequency f1 is preferable.

As shown in FIG. 12, when first detection frequency f1e is excessively higher than resonance frequency f1, the sensitivity of sensing foreign objects is small. Thus, it is preferable to preset first detection frequency f1e to a frequency higher than resonance frequency f1 in the range in which the sensitivity of sensing metallic foreign object 47 can be ensured.

The above configuration allows determination of whether metallic foreign object 47 is present only by detecting a change in the transmission power caused by the reflected wave at first detection frequency f1e, that is, a change in reception intensity. Specifically, transmitting circuit 521 detects reception intensity L1k of the reflected wave at first detection frequency f1e, and determines the presence of metallic foreign object 47 when the detected reception intensity is different from reception intensity L1e stored in the memory. As a result, metallic foreign object 47 can be sensed with a simple circuit configuration.

Thus, when a change in the reception intensity at first detection frequency f1e is sensed, transmitting circuit 521 transmits foreign object signal Er to power transmitting circuit 35. When receiving foreign object signal Er, power transmitting circuit 35 does not start power transmission and gives a warning. Thus, the presence of metallic foreign object 47 can be sensed before power transmission. This can prevent heat generation caused by metallic foreign object 47.

In the third exemplary embodiment, the presence or absence of metallic foreign object 47 is determined based on a change in reception intensity L1, but may be determined based on a change in resonance frequency f1.

Reception intensity L1 changes depending on the size of metallic foreign object 47, the space between sub antenna parts 29, and the space between sub antenna parts 45. Thus, by obtaining the correlation between the amount of change in reception intensity L1 and the size of metallic foreign object 47 in advance, the size of metallic foreign object 47 can be determined. Alternatively, depending on the size of metallic foreign object 47, the space between sub antenna parts 29 and the space between sub antenna parts 45 may be determined.

Figure 13:
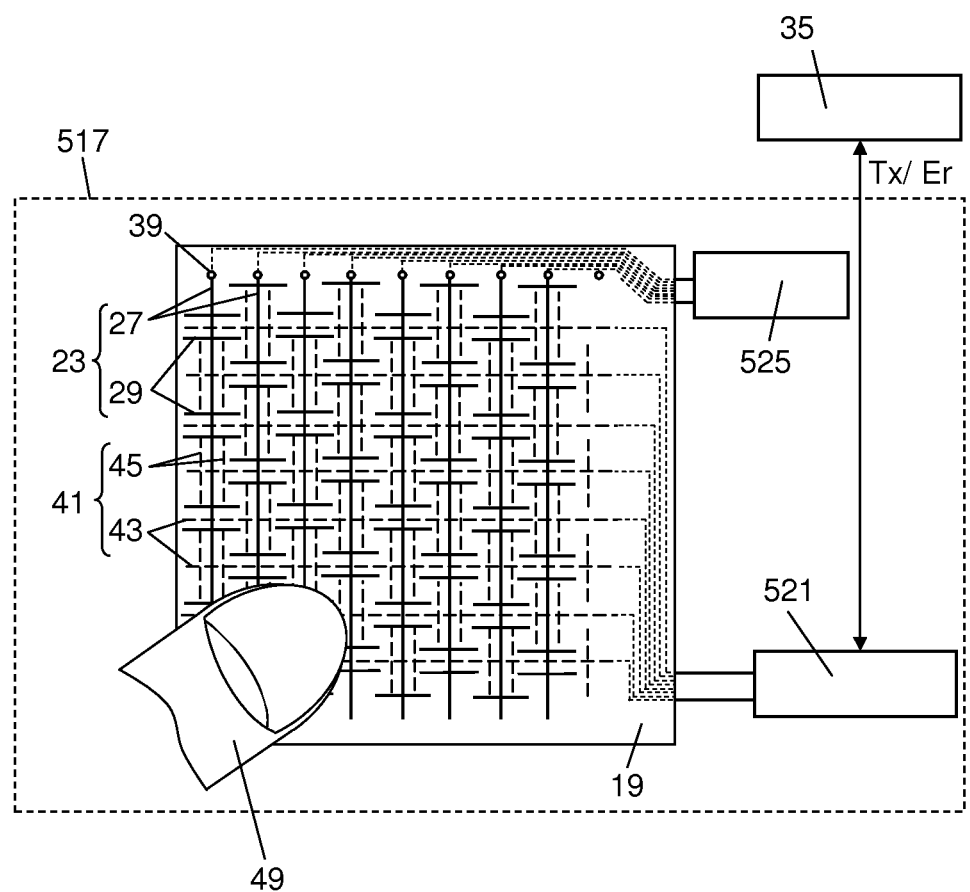
FIG. 13 is a top view of the sensor of the non-contact power supply apparatus when a finger approaches in accordance with the third exemplary embodiment.
Figure 14:
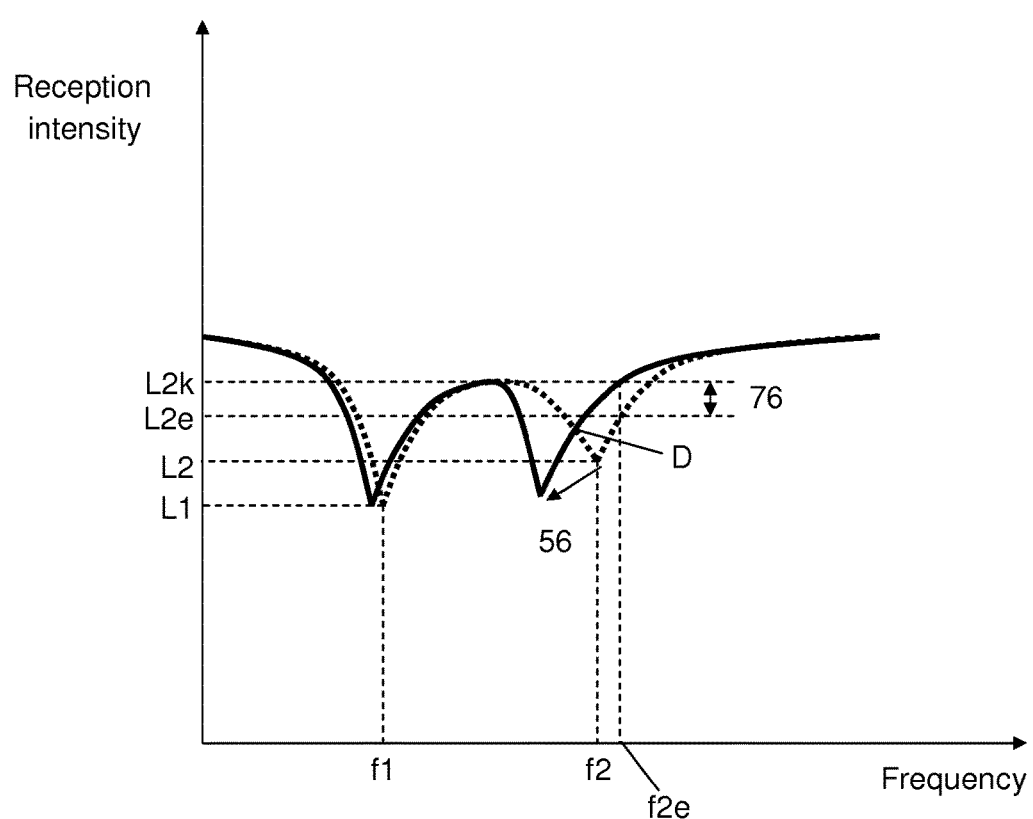
FIG. 14 is a frequency characteristic diagram of the non-contact power supply apparatus in accordance with the third exemplary embodiment.

Next, with reference to the accompanying drawings, a description is provided for the operation of non-contact power supply apparatus 511 when a living body approaches sensor 517. FIG. 13 is a top view of sensor 517 of non-contact power supply apparatus 511 when finger 49 approaches. FIG. 14 is a frequency characteristic diagram of non-contact power supply apparatus 511 in accordance with the third exemplary embodiment. In FIG. 14, the horizontal axis shows a frequency and the vertical axis shows a reception intensity. The solid line shows a frequency characteristic when finger 49 approaches and the broken line shows a frequency characteristic when finger 49 does not approach. Thus, the broken line in FIG. 14 shows the frequency characteristic the same as that shown by the solid line in FIG. 10.

A signal that has resonance frequency f1 and resonance frequency f2 and has been output from each of transmitting antennas 41 is partially reflected. Transmitting circuit 521 converts the reflected wave into a change in reception intensity (signal characteristics). Based on the reception intensity, transmitting circuit 521 determines whether a living body is present.

Finger 49 is grounded via the human body. Thus, the finger affects the signal characteristics of main antenna parts 27, 43 more than those of sub antenna parts 29, 45.

As finger 49 is approaching receiving antennas 23, for the reason the same as that of the first exemplary embodiment, resonance frequency f2 of main antenna parts 27, 43 is decreased. The frequency characteristic shown in FIG. 14 is the characteristic obtained by vertically inverting the frequency characteristic in FIG. 7. Thus, as finger 49 is approaching, reception intensity L2 of transmitting antennas 41 is decreased. Thus, by detecting such a change in the signal characteristics, the approach of finger 49 can be determined. In order to detect such a change using a simple circuit configuration, also in the third exemplary embodiment, it is preferable to detect a change in the reception intensity at second detection frequency f2e higher than resonance frequency f2 in main antenna parts 27, 43, similarly to the first exemplary embodiment. Even when resonance frequency f2 slightly fluctuates, this setting can reduce the possibility that the reception intensity reaches D point. Here, in FIG. 14, D point is the point where the solid line crosses the broken line at which the reception intensity hardly changes regardless of whether finger 49 is present. In FIG. 14, the difference of the change in the reception intensity at second detection frequency f2e is shown by double-pointed arrow 76.

Also in the third exemplary embodiment, similarly to the first exemplary embodiment, second detection frequency f2e may be set to a frequency lower than the frequency at D point at which the reception intensity does not reach D point even when resonance frequency f2 fluctuates. However, as obvious from the broken line in FIG. 14, as second detection frequency f2e becomes lower than the frequency at D point, the sensitivity of sensing foreign objects is rapidly decreased. This increases the error in sensitivity of sensing foreign objects that is caused by fluctuation of second detection frequency f2e. Thus, it is preferable to preset second detection frequency f2e to a frequency higher than resonance frequency f2.

When second detection frequency f2e is excessively higher than resonance frequency f2, the sensitivity of sensing foreign objects is small. Thus, it is preferable to preset second detection frequency f2e to a frequency higher than resonance frequency f2 in the range in which the sensitivity of sensing metallic foreign object 47 can be ensured.

In this exemplary embodiment, transmitting circuit 521 only needs to detect a change in the transmission power caused by the reflected wave at second detection frequency f2e, that is, a change in the reception intensity. Specifically, transmitting circuit 521 detects reception intensity L2k of the reflected wave at second detection frequency f2e, and determines the approach of finger 49 when the detected reception intensity is different from reception intensity L2e stored in the memory. As a result, finger 49 can be sensed with a simple circuit configuration.

Thus, transmitting circuit 521 obtains a change to reception intensity L2k at second detection frequency f2e, and transmits foreign object signal Er to power transmitting circuit 35 when finger 49 is approaching. Thus, before power transmission, power transmitting circuit 35 can warn that finger 49 is approaching.

In contrast, when reception intensity L2 at resonance frequency f2 remains unchanged, transmitting circuit 521 determines that finger 49 is not approaching and informs power transmitting circuit 35 of the determination. Power transmitting circuit 35 determines that finger 49 is not approaching sensor 517, and starts power transmission.

Here, the approach of finger 49 is determined based on a change in reception intensity L2, but may be determined based on a change in resonance frequency f2.

The reception intensity changes in accordance with the distance between finger 49 and sensor 517. Thus, the distance of finger 49 to the sensor at which no power transmission is performed is predetermined, and reception intensity L2k at the distance may be obtained.

As described in the first exemplary embodiment, not only finger 49 but also a large metallic foreign object can be sensed at second detection frequency f2e. That is, when a large metallic foreign object is inserted, a change in reception intensity L2 is as shown in FIG. 14. Thus, similarly to the operation of sensing finger 49, a large metallic foreign object can be sensed.

In this exemplary embodiment, presence of small metallic foreign object 47 between first coil 13 and second coil 15 mainly changes the electric field coupling in sub antenna parts 29, 45. Thus, in the characteristic of the reflected signal received by transmitting antennas 41, resonance frequency f1 and reception intensity L1 in transmitting sub antenna parts 45 mainly change. At this time, resonance frequency f2 and reception intensity L2 in transmitting main antenna parts 43 are almost unchanged.

Presence of a large metallic foreign object or a living body between first coil 13 and second coil 15 increases the effect of the electric field coupling in main antenna parts 27, 43. Thus, in the characteristic of the reflected signal received by transmitting antennas 41, resonance frequency f2 and reception intensity L2 in transmitting main antenna parts 43 considerably change. Therefore, both of a metallic foreign object and a living body can be sensed with high accuracy.

In the configuration of the third exemplary embodiment, a signal may be sequentially transmitted in order from a plurality of transmitting main antenna parts 43 and a plurality of transmitting sub antenna parts 45 of transmitting antennas 41, similarly to the second exemplary embodiment. Then, the reflection of the signal from receiving antennas 23 and receiving circuit 525 may be sequentially received by transmitting circuit 521.

A foreign object placed on the antennas produces electric field coupling, which changes the impedance of transmitting antennas 41. Thus, the signal output from transmitting circuit 521 is reflected by transmitting antennas 41. Therefore, the reflection of the signal from each of transmitting antennas 41 may be received by transmitting circuit 521.

Fourth Exemplary Embodiment

Figure 15:
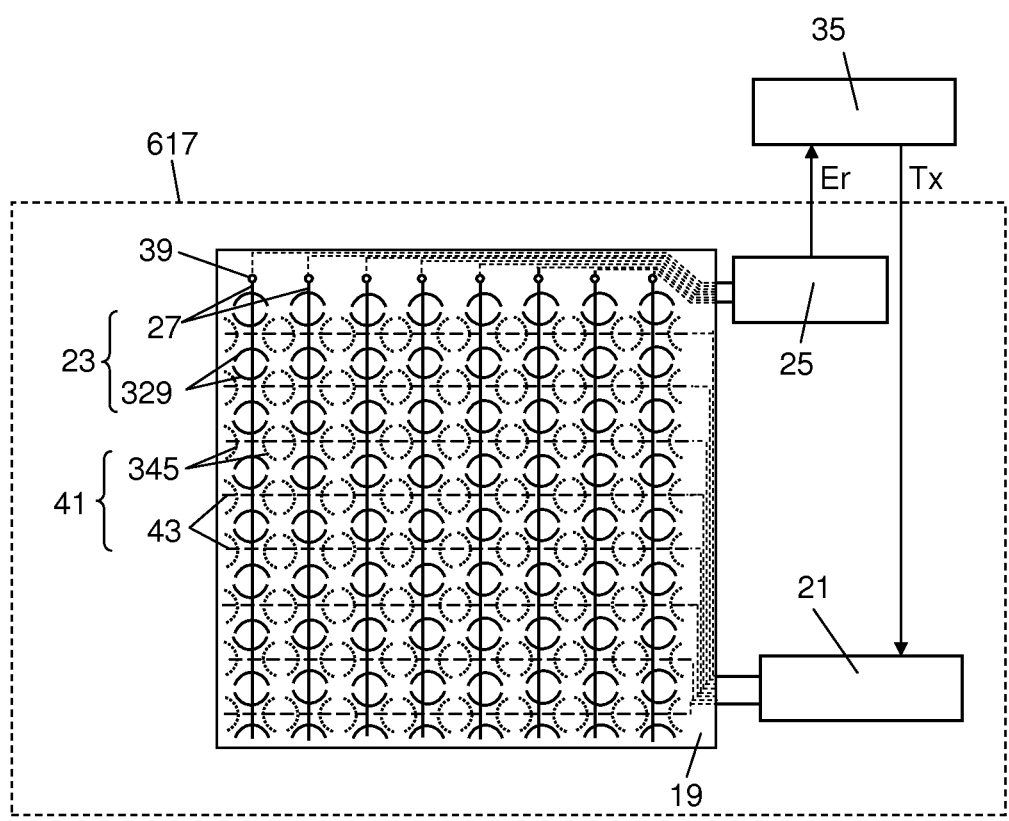
FIG. 15 is a top view of a sensor of a non-contact power supply apparatus in accordance with a fourth exemplary embodiment.
Figure 16A:
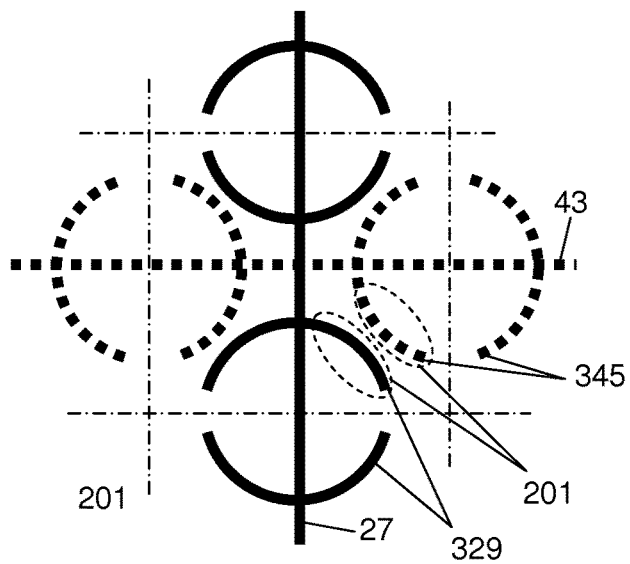
FIG. 16A is a diagram explaining a shape of each of sub antenna parts in accordance with the fourth exemplary embodiment.
Figure 16B:
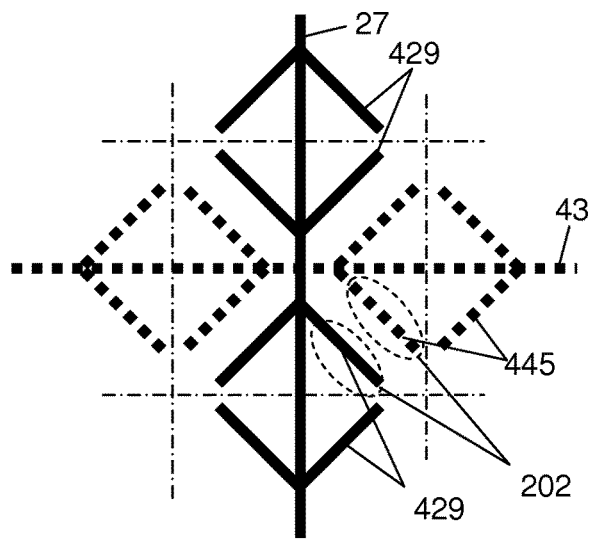
FIG. 16B is a diagram explaining another shape of each of sub antenna parts in accordance with the fourth exemplary embodiment.
Figure 16C:
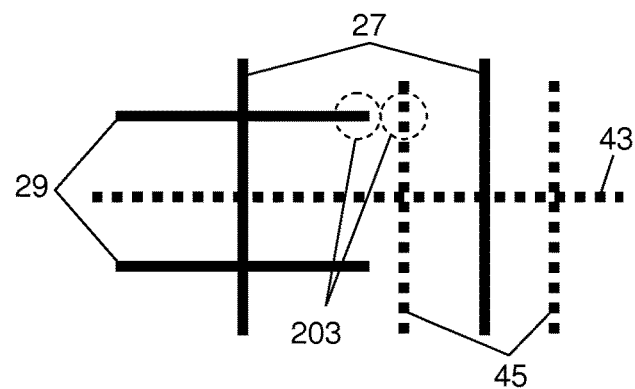
FIG. 16C is a diagram explaining a shape of each of sub antenna parts shown in FIG. 2C.

FIG. 15 is a top view of sensor 617 of a non-contact power supply apparatus in accordance with the fourth exemplary embodiment. FIG. 16A is a diagram explaining a shape of each of receiving sub antenna parts 329 and transmitting sub antenna parts 345 in accordance with the fourth exemplary embodiment. FIG. 16B is a diagram explaining another shape of each of receiving sub antenna parts 429 and transmitting sub antenna parts 445 in accordance with the fourth exemplary embodiment. FIG. 16C is a diagram explaining a shape of each of sub antenna parts 29, 45 shown in FIG. 2C and FIG. 9. In FIG. 16A through FIG. 16C, the thick solid lines show receiving main antenna parts 27 and receiving sub antenna parts 29, 329, 429, and thick broken lines show transmitting main antenna parts 43 and transmitting sub antenna parts 45, 345, 445.

The fourth exemplary embodiment and the first exemplary embodiment are different in the shape of receiving sub antenna parts 29, 329, 429 and transmitting sub antenna parts 45, 345, 445. The other elements are the same as those in the first exemplary embodiment; thus the detailed descriptions of those elements are omitted.

In FIG. 15 and FIG. 16A, each of receiving sub antenna parts 329 and transmitting sub antenna parts 345 is formed into an arc shape. In receiving sub antenna parts 329 adjacent to each other that are connected to same receiving main antenna part 27, arc directions are 180° different from each other. In other words, a plurality of receiving sub antenna parts 329 each of which is formed into a circular shape with two cut portions is connected to receiving main antenna part 27.

Similarly, in transmitting sub antenna parts 345 adjacent to each other that are connected to same transmitting main antenna part 43, arc directions are 180° different from each other. In other words, a plurality of transmitting sub antenna parts 345 that is formed into a circular shape with two cut portions is connected to transmitting main antenna part 43.

The cut portions in receiving sub antenna parts 329 and transmitting sub antenna parts 345 are provided to reduce eddy current in the electrode pattern generated in power transmission. That is, in a sub antenna part in a circular shape without any cut portion, eddy current flows in power transmission. This generates heat in receiving sub antenna parts 329 and transmitting sub antenna parts 345, which decreases the power transmission efficiency. Thus, it is preferable to form each of receiving sub antenna parts 329 and transmitting sub antenna parts 345 in an arc shape.

Transmitting main antenna parts 43 are configured to be orthogonal to receiving main antenna parts 27. Further, since each of receiving sub antenna parts 329 and each of transmitting sub antenna parts 345 have an identical shape, one circular shape with cut portions that forms receiving sub antenna parts 329 and one circular shape with cut portions that forms transmitting sub antenna parts 345 are alternately arranged along the diagonal direction of insulator 19.

Receiving sub antenna part 329 and transmitting sub antenna part 345 adjacent to each other do not overlap. Further, receiving sub antenna parts 329 adjacent to each other are line symmetrical with respect to the alternate long and short dash line shown in FIG. 16A. Transmitting sub antenna parts 345 adjacent to each other are line symmetrical with respect to the alternate long and short dash line shown in FIG. 16A.

In this exemplary embodiment, when finger 49 is present, sensing is performed by main antenna parts 27, 43. Thus, the sensing operation in this case is the same as described in the first exemplary embodiment.

Small metallic foreign object 47 is also sensed in a manner the same as that of the first exemplary embodiment, but the sensing accuracy is different. Hereinafter, a description is provided for the advantage of the fourth exemplary embodiment.

FIG. 16C is a partially enlarged view of sub antenna parts 29, 45 shown in FIG. 2C in the first exemplary embodiment. Suppose sub antenna parts 29 are linear and the adjacent ones are parallel to each other, and sub antenna parts 45 are linear and the adjacent ones are parallel to each other, as shown in FIG. 16C. In this case, as shown by thin dotted lines 203, the portion where receiving sub antenna part 29 is in the proximity of transmitting sub antenna part 45 is limited to the end of sub antenna part 29 (or sub antenna part 45).

In contrast, as shown by thin dotted lines 201, the portion where receiving sub antenna part 329 is in the proximity of transmitting sub antenna part 345 is formed along the arc shapes.

Thus, in the configuration of FIG. 16A, the portion where the receiving sub antenna part is in the proximity of the transmitting sub antenna part is longer than that in the configuration of FIG. 16C. Here, as described in the first exemplary embodiment, metallic foreign object 47 is sensed by a change in the electric field coupling between receiving sub antenna parts and transmitting sub antenna parts. Thus, as the length of the portion where the receiving sub antenna part is in the proximity of the transmitting sub antenna part increases, the change in the electric field coupling increases. This configuration extends the region where small metallic foreign object 47 can be detected. Thus, the configuration of FIG. 16A can detect small metallic foreign object 47 more accurately than the configuration of FIG. 16C.

In the fourth exemplary embodiment, each of receiving sub antenna parts 329 and transmitting sub antenna parts 345 has an arc shape. This arc is not limited to an arc in a circle, and may be an arc in an ellipse. Thus, each of receiving sub antenna parts 329 and transmitting sub antenna parts 345 may be a part of an elliptical shape. Also in this case, it is preferable to form cut portions to reduce eddy current. Further, it is preferable that receiving sub antenna part 329 and transmitting sub antenna part 345 adjacent to each other do not overlap.

The shape of each of receiving sub antenna parts 329 and transmitting sub antenna parts 345 may be the shape shown in FIG. 16B. In FIG. 16B, the thick solid lines show receiving main antenna part 27 and receiving sub antenna parts 429, and the thick broken lines show transmitting main antenna part 43 and transmitting sub antenna parts 445. The shape in FIG. 16B satisfies the following conditions. First, receiving sub antenna parts 429 and transmitting sub antenna parts 445 are linear. Receiving sub antenna part 429 and transmitting sub antenna part 445 adjacent to each other do not overlap. Further, adjacent ones of receiving sub antenna parts 429 are non-parallel to and line symmetrical with each other. Further, adjacent ones of transmitting sub antenna parts 445 are non-parallel to and line symmetrical with each other. The line symmetry shows the line symmetry with respect to the alternate long and short dash lines in FIG. 16B.

As shown by thin dotted lines 202 in FIG. 16B, the portion where receiving sub antenna part 429 is in the proximity of transmitting sub antenna part 445 is formed along proximate lines. Thus, in the configuration of FIG. 16B, the portion where the receiving sub antenna part is in the proximity of the transmitting sub antenna part is longer than that in the configuration of FIG. 16C. Therefore, in the configuration of FIG. 16B, a change in the electric field coupling is larger than that in the configuration of FIG. 16C; thus small metallic foreign object 47 can be sensed more accurately.

In FIG. 16B, each of receiving sub antenna parts 429 is formed in a direction at 45° with respect to receiving main antenna part 27, and each of transmitting sub antenna parts 445 is formed in a direction at 45° with respect to transmitting main antenna part 43. However, this angle is not limited to 45°, and the sub antenna parts and the corresponding main antenna part only need to be non-parallel to each other. However, an angle of 45° increases the portion where receiving sub antenna part 429 is in the proximity of transmitting sub antenna part 445, and thus is preferable.

In the fourth exemplary embodiment, a description is provided for the case where the advantageous configuration is applied to the first exemplary embodiment. However, the advantageous configuration may be applied to the second and third exemplary embodiments.

Fifth Exemplary Embodiment

Figure 17A:
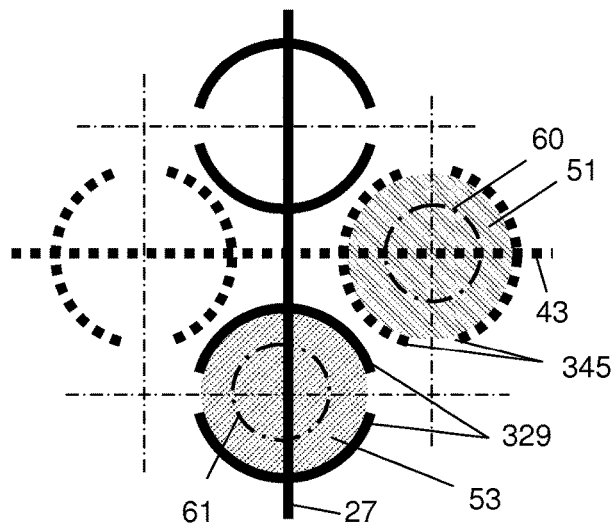
FIG. 17A is an explanatory view of the sub antenna parts shown in FIG. 16A when foreign objects are present.
Figure 17B:
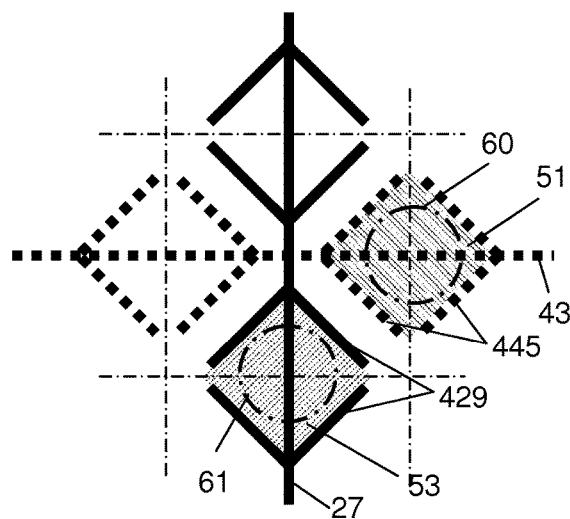
FIG. 17B is an explanatory view of the sub antenna parts shown in FIG. 16B when foreign objects are present.
Figure 17C:
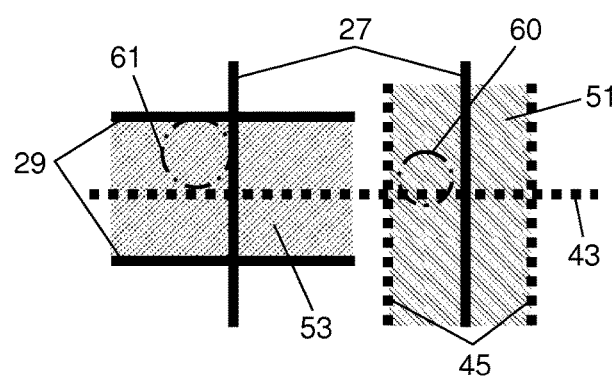
FIG. 17C is an explanatory view of the sub antenna parts shown in FIG. 16C when foreign objects are present.
Figure 18A:
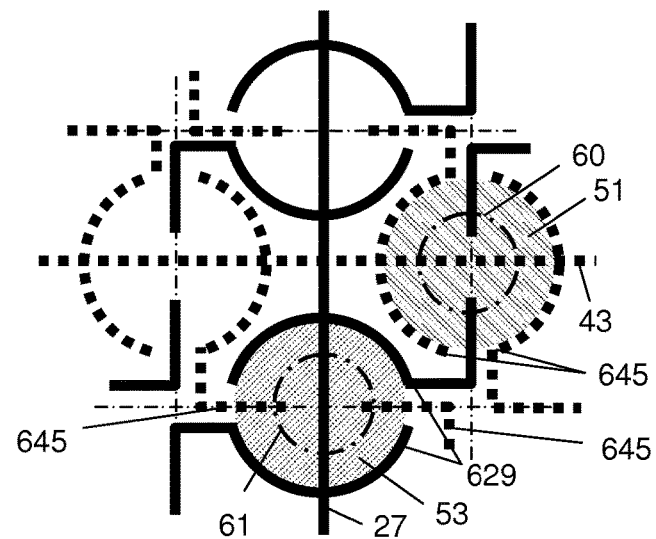
FIG. 18A is a diagram explaining a shape of each of sub antenna parts in accordance with a fifth exemplary embodiment.
Figure 18B:
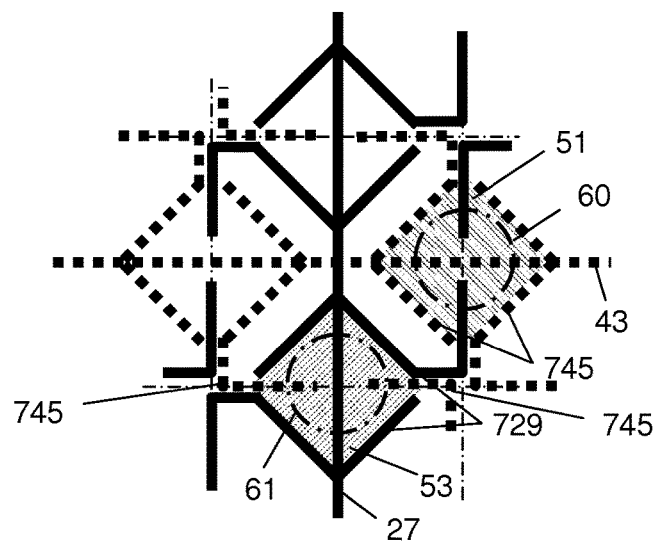
FIG. 18B is a diagram explaining another shape of each of sub antenna parts in accordance with the fifth exemplary embodiment.
Figure 18C:
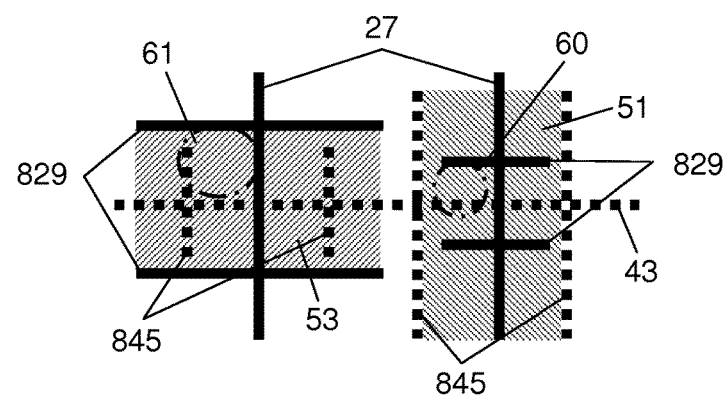
FIG. 18C is a diagram explaining still another shape of each of sub antenna parts in accordance with the fifth exemplary embodiment.
Figure 19:
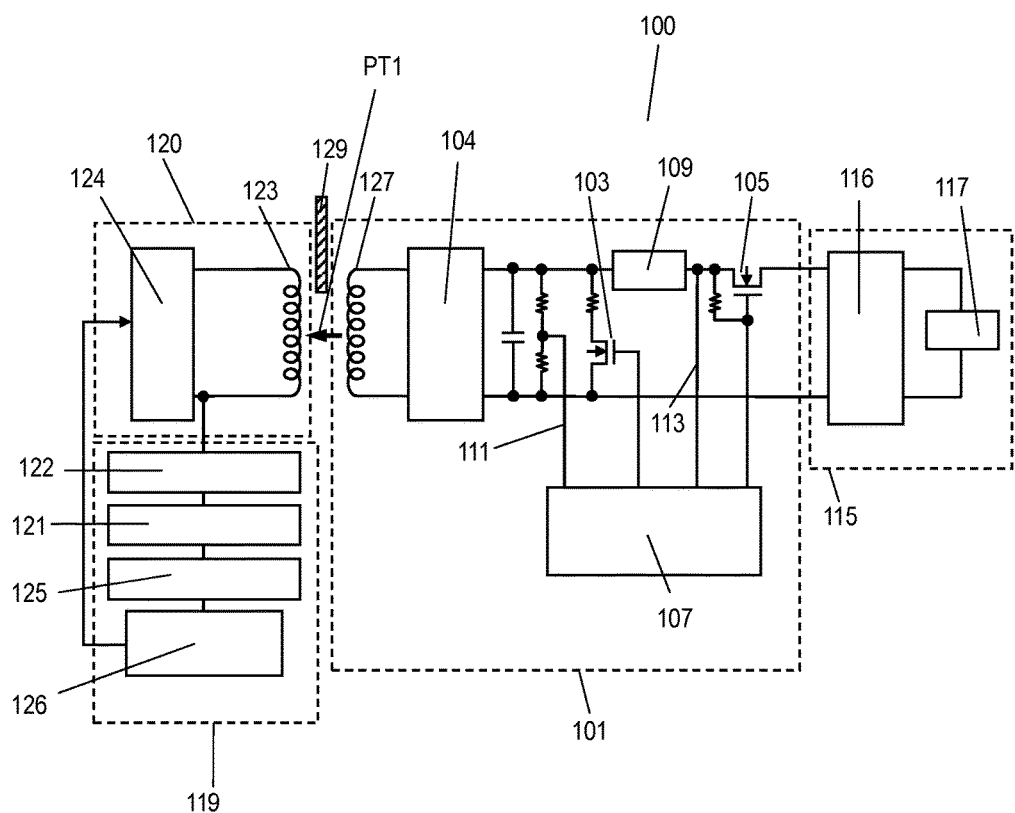
FIG. 19 is a circuit diagram of an essential part of a conventional non-contact power supply apparatus.

FIG. 17A is an explanatory view of receiving sub antenna parts 329 and transmitting sub antenna parts 345 shown in FIG. 16A when foreign objects are present. FIG. 17B is an explanatory view of receiving sub antenna parts 429 and transmitting sub antenna parts 445 shown in FIG. 16B when foreign objects are present. FIG. 17C is an explanatory view of receiving sub antenna parts 29 and transmitting sub antenna parts 45 shown in FIG. 16C when foreign objects are present. FIG. 18A is a diagram explaining a shape of each of sub antenna parts 629, 645 in accordance with the fifth exemplary embodiment. FIG. 18B is a diagram explaining another shape of each of sub antenna parts 729, 745 in accordance with the fifth exemplary embodiment. FIG. 18C is a diagram explaining still another shape of each of sub antenna parts 829, 845 in accordance with the fifth exemplary embodiment. The fifth exemplary embodiment is different from the fourth exemplary embodiment in the shape of receiving sub antenna parts and transmitting sub antenna parts.

In the fifth exemplary embodiment, the region surrounded by adjacent ones of transmitting sub antenna parts 645, 745, 845 is defined as first region 51. The region surrounded by adjacent ones of receiving sub antenna parts 629, 729, 829 is defined as second region 53. Part of each of receiving sub antenna parts 629, 729, 829 enters first region 51, and part of each of transmitting sub antenna parts 645, 745, 845 enters second region 53.

Hereinafter, the configuration of the fifth exemplary embodiment is detailed. For instance, suppose a small foreign object is present in the portion surrounded by alternate long and short dash line 60 in FIG. 17A. In this case, the circle made by the alternate long and short dash line overlaps part of transmitting main antenna part 43, but overlaps neither transmitting sub antenna part 345 nor receiving sub antenna part 329.

For instance, suppose a small foreign object is present in the portion surrounded by alternate long and short dash line 61 in FIG. 17A. In this case, the circle made by the alternate long and short dash line overlaps part of receiving main antenna part 27, but overlaps neither transmitting sub antenna part 345 nor receiving sub antenna part 329. Under these conditions, coupling between transmitting antennas and receiving antennas is almost unchanged; thus the sensitivity is low.

In order to improve the sensitivity, in FIG. 18A, part of each of receiving sub antenna parts 629 enters first region 51, and part of each of transmitting sub antenna parts 645 enters second region 53. Thus, even a small foreign object can be detected.

This improvement is also applied to the configurations in FIG. 18B and FIG. 18C. That is, in FIG. 17B, neither transmitting sub antenna part 445 nor receiving sub antenna part 429 enters first region 51 and second region 53. In FIG. 17C, neither transmitting sub antenna part 45 nor receiving sub antenna part 29 enters first region 51 and second region 53. Thus, the sensitivity in these regions is low.

In contrast, in FIG. 18B, part of each of receiving sub antenna parts 729 enters first region 51, and part of each of transmitting sub antenna parts 745 enters second region 53. Thus, similarly to the configuration of FIG. 18A, a small foreign object can be detected.

In FIG. 18C, part of each of receiving sub antenna parts 829 enters first region 51, and part of each of transmitting sub antenna parts 845 enters second region 53. Thus, similarly to the configuration of FIG. 18A, a small foreign object can be detected.

The method for sensing a small foreign object is the same as those in first through third exemplary embodiments.

Each of the above configurations reduces the region having only receiving main antenna parts and the region having only transmitting main antenna parts. This increases the probability that a small foreign object is present in the region having both receiving main antenna parts and transmitting sub antenna parts or the region having both transmitting main antenna parts and receiving sub antenna parts. Thus, even a small foreign object can be detected.

In order to detect a small foreign object, the space between main antenna parts 27, the space between main antenna parts 43, the space between sub antenna parts 29, and the space between sub antenna parts 45 in FIG. 2C may be reduced. However, when the spaces between electrodes are reduced, the total area of the metal constituting the antenna portion is increased. This increases the eddy current flowing in the metal in the antenna portion, which increases the amount of heat generation. Thus, the configuration of the fifth exemplary embodiment is preferable.

In each of the first through fifth exemplary embodiments, transmitting antennas 41 are formed on the first face (back side) and receiving antenna parts 23 are formed on the second face (front side) of insulator 19 of the corresponding one of sensors 17, 517, 617. However, the antennas may be formed on the faces opposite the above.

In each of the first through fifth exemplary embodiments, first coil 13 is a receiving coil and second coil 15 is a power transmitting coil. However, the first coil and the second coil may be used for the opposite purpose.

In each of the first through fifth exemplary embodiments, first coil 13 is disposed on the bottom side of first holder 31 and second coil 15 is disposed on the top side of second holder 34. However, the following configuration, for example, may be used. First coil 13 is disposed on a wall surface and second coil 15 is opposed to first coil 13.

INDUSTRIAL APPLICABILITY

A non-contact power supply apparatus in accordance with the exemplary embodiments is capable of detecting a metallic foreign object or a living body with high accuracy, and thus is useful as a non-contact power supply apparatus, for example, for transmitting electric power in a non-contact manner.

REFERENCE MARKS IN THE DRAWINGS 11, 511 Non-contact power supply apparatus
13 First coil
15 Second coil
17, 517, 617 Sensor
19 Insulator
21, 521 Transmitting circuit
23 Receiving antenna
25, 525 Receiving circuit
27 Receiving main antenna part
29, 329, 429, 629, 729, 829 Receiving sub antenna part
30, 70, 72, 74, 76 Double-pointed arrow
41 Transmitting antenna
43 Transmitting main antenna part
45, 345, 445, 645, 745, 845 Transmitting sub antenna part
47 Metallic foreign object
49 Finger
50, 52, 54, 56 Arrow
60, 61 Alternate long and short dash line
201, 202, 203 Thin dotted line

The invention claimed is:

1. A non-contact power supply apparatus comprising:
a first coil for receiving power from a power transmitting circuit;
a second coil opposed to the first coil for receiving the power from the first coil in a non-contact manner; and
a sensor including:
a plate-like insulator disposed between the first coil and the second coil;
a transmitting main antenna part formed, in a straight shape, on a first face of the insulator;
a transmitting sub antenna part formed on the first face of the insulator, intersecting the transmitting main antenna part, and electrically connected to the transmitting main antenna part;
a transmitting circuit electrically connected to the transmitting main antenna part, and transmitting a signal;
a receiving main antenna part formed, in a straight shape, on a second face, which is opposite the first face, of the insulator;
a receiving sub antenna part formed on the second face of the insulator, intersecting the receiving main antenna part, and electrically connected to the receiving main antenna part; and
a receiving circuit electrically connected to the receiving main antenna part,
wherein the receiving circuit receives the signal through the receiving main antenna part and the receiving sub antenna part, and senses an object, except the insulator, between the first coil and the second coil, based on a change in a reception intensity of the signal received.

2. The non-contact power supply apparatus of claim 1, wherein the transmitting main antenna part is orthogonal to the receiving main antenna part.

3. The non-contact power supply apparatus of claim 1, wherein
each of the transmitting sub antenna part and the receiving sub antenna part is in a straight shape,
the transmitting sub antenna part is orthogonal to the transmitting main antenna part, and
the receiving sub antenna part is orthogonal to the receiving main antenna part.

4. The non-contact power supply apparatus of claim 1, wherein
the transmitting main antenna part is one of a plurality of transmitting main antenna parts, the transmitting sub antenna part is one of a plurality of transmitting sub antenna parts, the receiving main antenna part is one of a plurality of receiving main antenna parts, and the receiving sub antenna part is one of a plurality of receiving sub antenna parts,
each of the transmitting sub antenna parts does not overlap the transmitting main antenna parts adjacent to the transmitting sub antenna part, and
each of the receiving sub antenna parts does not overlap the receiving main antenna parts adjacent to the receiving sub antenna part.

5. The non-contact power supply apparatus of claim 4, wherein
when the insulator is perspectively viewed from the first coil, each of the transmitting sub antenna parts does not overlap any of the receiving main antenna parts, and each of the receiving sub antenna parts does not overlap any of the transmitting main antenna parts.

6. The non-contact power supply apparatus of claim 1, wherein the change in the reception intensity of the signal is a change in a reception intensity detected at a frequency higher than a resonance frequency of the transmitting sub antenna part and the receiving sub antenna part.

7. The non-contact power supply apparatus of claim 1, wherein the change in the reception intensity of the signal is a change in a reception intensity detected at a frequency higher than a resonance frequency of the transmitting main antenna part and the receiving main antenna part.

8. The non-contact power supply apparatus of claim 1, wherein
the transmitting main antenna part is one of a plurality of transmitting main antenna parts, the transmitting sub antenna part is one of a plurality of transmitting sub antenna parts, the receiving main antenna part is one of a plurality of receiving main antenna parts, and the receiving sub antenna part is one of a plurality of receiving sub antenna parts,
the transmitting circuit sequentially transmits a signal to the plurality of transmitting main antenna parts, and sequentially outputs the signal through the transmitting main antenna parts and the transmitting sub antenna parts connected to the transmitting main antenna parts, and
the receiving circuit sequentially receives the signal from the plurality of receiving main antenna parts through the receiving main antenna parts and the receiving sub antenna parts connected to the receiving main antenna parts.

9. The non-contact power supply apparatus of claim 1, wherein each of the transmitting sub antenna part and the receiving sub antenna part is in an arc shape.

10. The non-contact power supply apparatus of claim 9, wherein
the transmitting sub antenna part is one of a plurality of transmitting sub antenna parts, and the receiving sub antenna part is one of a plurality of receiving sub antenna parts,
adjacent ones of the transmitting sub antenna parts are formed so that arc directions thereof are 180° different from each other, and adjacent ones of the receiving sub antenna parts are formed so that arc directions thereof are 180° different from each other.

11. The non-contact power supply apparatus of claim 1, wherein
the transmitting sub antenna part is one of a plurality of transmitting sub antenna parts, and the receiving sub antenna part is one of a plurality of receiving sub antenna parts,
adjacent ones of the transmitting sub antenna parts are line symmetrical with each other, and
adjacent ones of the receiving sub antenna parts are line symmetrical with each other.

12. The non-contact power supply apparatus of claim 1, wherein
the transmitting sub antenna part is one of a plurality of transmitting sub antenna parts, and the receiving sub antenna part is one of a plurality of receiving sub antenna parts,
adjacent ones of the transmitting sub antenna parts are non-parallel to each other, and
adjacent ones of the receiving sub antenna parts are non-parallel to each other.

13. The non-contact power supply apparatus of claim 1, wherein
the transmitting sub antenna part is one of a plurality of transmitting sub antenna parts, and the receiving sub antenna part is one of a plurality of receiving sub antenna parts,
each of the transmitting sub antenna parts and the receiving sub antenna parts is in a straight shape,
each of the transmitting sub antenna parts extends in a direction at 45° with respect to the transmitting main antenna part, and
each of the receiving sub antenna parts extends in a direction at 45° with respect to the receiving main antenna part.

14. The non-contact power supply apparatus of claim 1, wherein
the transmitting sub antenna part is one of a plurality of transmitting sub antenna parts, and the receiving sub antenna part is one of a plurality of receiving sub antenna parts, and
when the insulator is perspectively viewed from the first coil, part of each of the receiving sub antenna parts enters a region surrounded by adjacent ones of the transmitting sub antenna parts, and part of each of the transmitting sub antenna parts enters a region surrounded by adjacent ones of the receiving sub antenna parts.

15. A non-contact power supply apparatus comprising:
a first coil for receiving power from a power transmitting circuit;
a second coil opposed to the first coil for receiving the power from the first coil in a non-contact manner; and
a sensor including:
a plate-like insulator disposed between the first coil and the second coil;
a transmitting main antenna part formed, in a straight shape, on a first face of the insulator;
a transmitting sub antenna part formed on the first face of the insulator, intersecting the transmitting main antenna part, and electrically connected to the transmitting main antenna part;
a transmitting circuit electrically connected to the transmitting main antenna part, and transmitting a signal;
a receiving main antenna part formed, in a straight shape, on a second face, which is opposite the first face, of the insulator;
a receiving sub antenna part formed on the second face of the insulator, intersecting the receiving main antenna part, and electrically connected to the receiving main antenna part; and
a receiving circuit electrically connected to the receiving main antenna part,
wherein the transmitting circuit receives a reflected signal of the signal transmitted, and senses an object, except the insulator, between the first coil and the second coil, based on a change in a reception intensity of the reflected signal received.

16. The non-contact power supply apparatus of claim 15, wherein the transmitting main antenna part is orthogonal to the receiving main antenna part.

17. The non-contact power supply apparatus of claim 15, wherein
each of the transmitting sub antenna part and the receiving sub antenna part is in a straight shape,
the transmitting sub antenna part is orthogonal to the transmitting main antenna part, and
the receiving sub antenna part is orthogonal to the receiving main antenna part.

18. The non-contact power supply apparatus of claim 15, wherein
the transmitting main antenna part is one of a plurality of transmitting main antenna parts, the transmitting sub antenna part is one of a plurality of transmitting sub antenna parts, the receiving main antenna part is one of a plurality of receiving main antenna parts, and the receiving sub antenna part is one of a plurality of receiving sub antenna parts,
each of the transmitting sub antenna parts does not overlap the transmitting main antenna parts adjacent to the transmitting sub antenna part, and
each of the receiving sub antenna parts does not overlap the receiving main antenna parts adjacent to the receiving sub antenna part.

19. The non-contact power supply apparatus of claim 18, wherein
when the insulator is perspectively viewed from the first coil, each of the transmitting sub antenna parts does not overlap any of the receiving main antenna parts, and each of the receiving sub antenna parts does not overlap any of the transmitting main antenna parts.

20. The non-contact power supply apparatus of claim 15, wherein the change in the reception intensity of the signal is a change in reception intensity detected at a frequency higher than a resonance frequency of the transmitting sub antenna part and the receiving sub antenna part.

21. The non-contact power supply apparatus of claim 15, wherein the change in the reception intensity of the signal is a change in reception intensity detected at a frequency higher than a resonance frequency of the transmitting main antenna part and the receiving main antenna part.

22. The non-contact power supply apparatus of claim 15, wherein
the transmitting main antenna part is one of a plurality of transmitting main antenna parts, the transmitting sub antenna part is one of a plurality of transmitting sub antenna parts, the receiving main antenna part is one of a plurality of receiving main antenna parts, and the receiving sub antenna part is one of a plurality of receiving sub antenna parts, the transmitting circuit sequentially transmits a signal to the plurality of transmitting main antenna parts, and sequentially outputs the signal through the transmitting main antenna parts and the transmitting sub antenna parts connected to the transmitting main antenna parts, and the transmitting circuit receives a reflected signal of the signal transmitted.

23. The non-contact power supply apparatus of claim 15, wherein each of the transmitting sub antenna part and the receiving sub antenna part is in an arc shape.

24. The non-contact power supply apparatus of claim 23, wherein the transmitting sub antenna part is one of a plurality of transmitting sub antenna parts, and the receiving sub antenna part is one of a plurality of receiving sub antenna parts, adjacent ones of the transmitting sub antenna parts are formed so that arc directions thereof are 180° different from each other, and adjacent ones of the receiving sub antenna parts are formed so that arc directions thereof are 180° different from each other.

25. The non-contact power supply apparatus of claim 15, wherein the transmitting sub antenna part is one of a plurality of transmitting sub antenna parts, and the receiving sub antenna part is one of a plurality of receiving sub antenna parts, adjacent ones of the transmitting sub antenna parts are line symmetrical with each other, and adjacent ones of the receiving sub antenna parts are line symmetrical with each other.

26. The non-contact power supply apparatus of claim 15, wherein the transmitting sub antenna part is one of a plurality of transmitting sub antenna parts, and the receiving sub antenna part is one of a plurality of receiving sub antenna parts, adjacent ones of the transmitting sub antenna parts are non-parallel to each other, and adjacent ones of the receiving sub antenna parts are non-parallel to each other.

27. The non-contact power supply apparatus of claim 15, wherein the transmitting sub antenna part is one of a plurality of transmitting sub antenna parts, and the receiving sub antenna part is one of a plurality of receiving sub antenna parts, each of the transmitting sub antenna parts and the receiving sub antenna parts is in a straight shape, each of the transmitting sub antenna parts extends in a direction at 45° with respect to the transmitting main antenna part, and each of the receiving sub antenna parts extends in a direction at 45° with respect to the receiving main antenna part.

28. The non-contact power supply apparatus of claim 15, wherein the transmitting sub antenna part is one of a plurality of transmitting sub antenna parts, and the receiving sub antenna part is one of a plurality of receiving sub antenna parts, and when the insulator is perspectively viewed from the first coil, part of each of the receiving sub antenna parts enters a region surrounded by adjacent ones of the transmitting sub antenna parts, and part of each of the transmitting sub antenna parts enters a region surrounded by adjacent ones of the receiving sub antenna parts.

* * * * *